US012608858B2

(12) United States Patent
Zhou et al.

(10) Patent No.: US 12,608,858 B2
(45) Date of Patent: Apr. 21, 2026

(54) IMAGE GENERATION WITH MULTIPLE IMAGE EDITING MODES

(71) Applicant: ADOBE INC., San Jose, CA (US)

(72) Inventors: Yuqian Zhou, Bellevue, WA (US);
Krishna Kumar Singh, San Jose, CA
(US); Zhifei Zhang, San Jose, CA
(US); Difan Liu, San Jose, CA (US);
Zhe Lin, Clyde Hill, WA (US);
Jianming Zhang, Fremont, CA (US);
Qing Liu, Santa Clara, CA (US);
Jingwan Lu, Sunnyvale, CA (US);
Elya Shechtman, Seattle, WA (US);
Sohrab Amirghodsi, Seattle, WA (US);
Connelly Stuart Barnes, Seattle, WA
(US)

(73) Assignee: ADOBE INC., San Jose, CA (US)

( * ) Notice: Subject to any disclaimer, the term of this
patent is extended or adjusted under 35
U.S.C. 154(b) by 93 days.

(21) Appl. No.: 18/474,536

(22) Filed: Sep. 26, 2023

(65) Prior Publication Data

US 2024/0338869 A1 Oct. 10, 2024

Related U.S. Application Data

(60) Provisional application No. 63/495,224, filed on Apr.
10, 2023.

(51) Int. Cl.
G06T 11/60 (2006.01)
(52) U.S. Cl.
CPC .................................... G06T 11/60 (2013.01)

(58) Field of Classification Search
CPC ........................................................ G06T 11/60
USPC .......................................................... 345/629
See application file for complete search history.

(56) References Cited

U.S. PATENT DOCUMENTS

| | | | |
|---|---|---|---|
| 11,983,850 B2* | 5/2024 | Wang ..................... | G06N 3/045 |
| 2021/0073959 A1* | 3/2021 | Elmalem ................ | G06N 3/084 |
| 2021/0150681 A1* | 5/2021 | Sytnik ........................ | G06T 5/50 |
| 2021/0233248 A1* | 7/2021 | Li ............................. | G06T 5/94 |
| 2021/0265043 A1* | 8/2021 | Haghighi ................ | G16H 50/20 |
| 2021/0287799 A1* | 9/2021 | Guendel ................ | G16H 30/40 |
| 2021/0353393 A1* | 11/2021 | Kearney ................ | G16H 50/30 |
| 2022/0138931 A1* | 5/2022 | Palma ..................... | G06T 7/174 |
| | | | 382/128 |
| 2022/0138932 A1* | 5/2022 | Bonakdar Sakhi .... | G16H 50/50 |
| | | | 382/128 |
| 2022/0139552 A1* | 5/2022 | Binder ................... | G16H 30/40 |
| | | | 705/2 |

(Continued)

OTHER PUBLICATIONS

"Mask-Guided Portrait Editing With Conditional GANs"; Proceedings of the IEEE/CVF Conference on Computer Vision and Pattern Recognition (Year: 2019).*

(Continued)

*Primary Examiner* — David T Welch
(74) *Attorney, Agent, or Firm* — F. CHAU &
ASSOCIATES, LLC

(57) ABSTRACT

An image processing system obtains an input image (e.g., a
user provided image, etc.) and a mask indicating an edit
region of the image. A user selects an image editing mode for
an image generation network from a plurality of image
editing modes. The image generation network generates an
output image using the input image, the mask, and the image
editing mode.

16 Claims, 20 Drawing Sheets

(56) References Cited

U.S. PATENT DOCUMENTS

| | | | | |
|---|---|---|---|---|
| 2022/0165052 | A1* | 5/2022 | Gan | G06V 10/774 |
| 2022/0301118 | A1* | 9/2022 | Frey | G06T 5/77 |
| 2023/0103638 | A1* | 4/2023 | Saharia | G06V 10/454 |
| | | | | 382/155 |
| 2023/0149092 | A1* | 5/2023 | Fouts | G06N 3/0464 |
| | | | | 600/300 |
| 2023/0196718 | A1* | 6/2023 | Li | G06T 3/40 |
| | | | | 382/203 |
| 2024/0062345 | A1* | 2/2024 | Kulshreshtha | G06V 20/70 |
| 2024/0161468 | A1* | 5/2024 | Li | G06V 10/82 |
| 2024/0257419 | A1* | 8/2024 | He | G06T 7/73 |
| 2024/0428482 | A1* | 12/2024 | Khodadadeh | G06T 11/00 |

OTHER PUBLICATIONS

"MaskGIT: Masked Generative Image Transformer"; Proceedings of the IEEE/CVF Conference on Computer Vision and Pattern Recognition (Year: 2022).*
"DiffEdit: Diffusion-Based Semantic Image Editing with Mask Guidance"; Computer Vision and Pattern Recognition (Year: 2022).*

* cited by examiner

Obtain Image
305

Obtain Mask
310

Determine
Image Editing Mode
315

Generate
Output Image
320

300

Provide an input image and a mask indicating an edit region of the image ⟍405

Identify an image editing mode ⟍410

Generate an output image using an image generation network based on the input image, the mask, and the image editing mode ⟍415

Obtain training data including a set of training samples corresponding to a set of image editing modes, respectively ⌐1805

Train an image generation network to generate output images corresponding to each of the set of image editing modes using the training data ⌐1810

—1800

Figure 20:
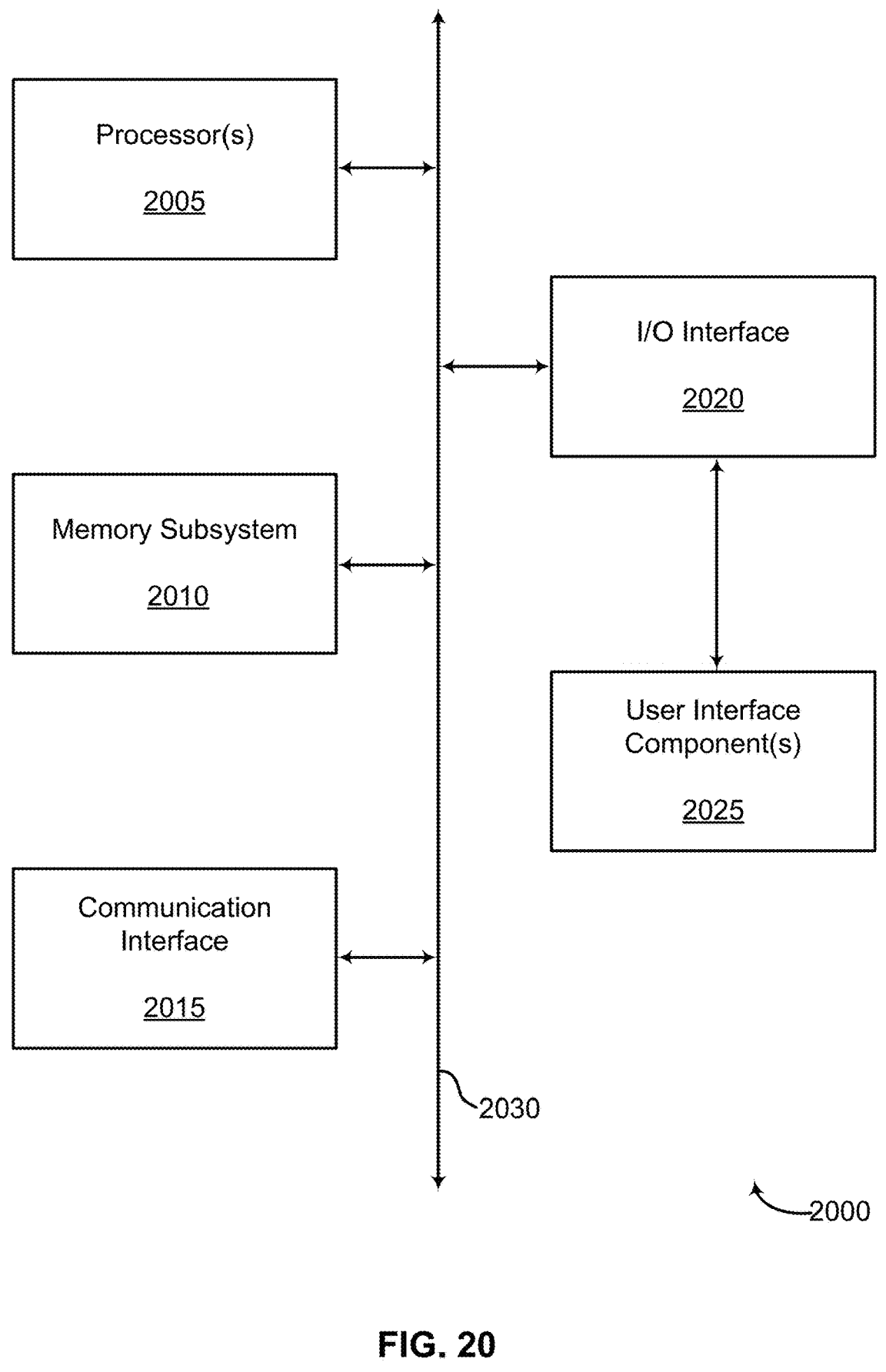

Processor(s)

2005

I/O Interface

2020

Memory Subsystem

2010

User Interface
Component(s)

2025

Communication
Interface

IMAGE GENERATION WITH MULTIPLE IMAGE EDITING MODES

CROSS-REFERENCE TO RELATED APPLICATION

This application claims priority under 35 USC § 119 (a) to U.S. Patent Application No. 63/495,224 filed on Apr. 10, 2023, the disclosure of which is incorporated by reference herein in its entirety.

BACKGROUND

The following relates generally to image processing, and more specifically to masking and sampling scheme designs for diffusion-based inpainting/outpainting models.

Image processing technologies have become increasingly important in various fields including photography, video processing, computer vision, and more. Image processing or digital image processing refers to the use of a computer to edit a digital image (e.g., or synthesize an image) using an algorithm or a processing network. In some cases, a neural network or a machine learning model may be used to generate an edited image based on a source image and user input (e.g., based on changes to a source image that are desired by a user).

For example, a neural network may obtain an image from a user and add or modify certain content associated with the image. Image inpainting is a process of filling in missing or damaged (e.g., inaccurate) parts of an image with plausible content. Some image inpainting techniques may analyze an area surrounding some region of an image, where such surrounding information may be used to refine the image or fill in gaps of the image (e.g., in an inpainting region). Image outpainting is a process of extending boundaries of an image by adding new content beyond some original source image region. Generally, image inpainting techniques and image outpainting techniques may be implemented to maintain a natural and seamless appearance of the image after modification of the image for various applications.

SUMMARY

The present disclosure describes systems and methods for image processing. Embodiments of the present disclosure include masking schemes, training methods, sampling methods, and dilation techniques that enable an efficient diffusion-based inpainting/outpainting model that supports a variety of different use cases.

For instance, a method, apparatus, non-transitory computer readable medium, and system for image processing (e.g., for a diffusion-based inpainting/outpainting model) are described. One or more aspects of the method, apparatus, non-transitory computer readable medium, and system include obtaining an input image and a mask indicating an edit region of the image; identifying an image editing mode; and generating an output image using an image generation network based on the input image, the mask, and the image editing mode.

BRIEF DESCRIPTION OF THE DRAWINGS

FIGS. 5 through 11 show example mask types according to aspects of the present disclosure.

FIG. 20 shows an example of a computing device according to aspects of the present disclosure.

DETAILED DESCRIPTION

Figure 1:
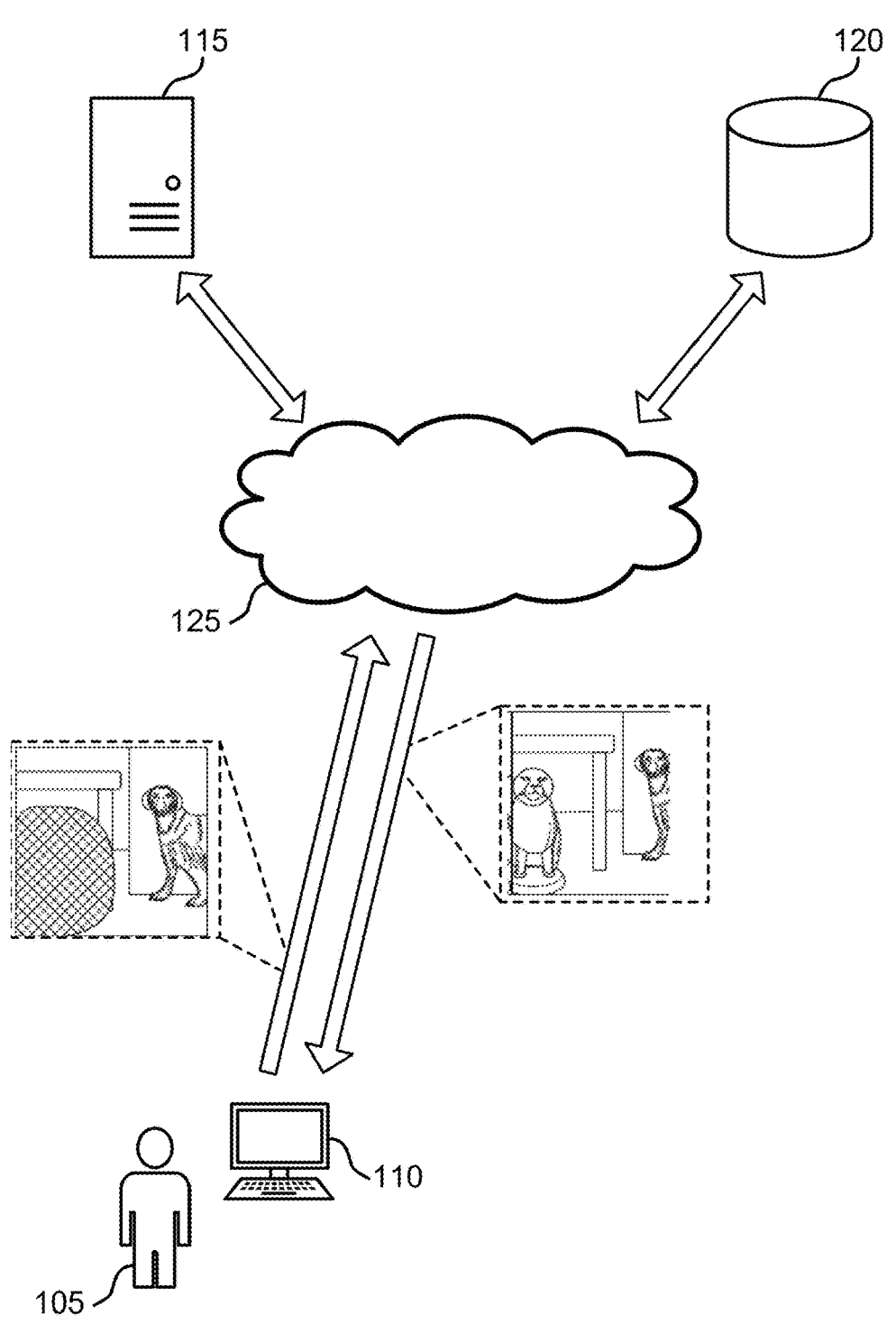
FIG. 1 shows an example of an image processing system according to aspects of the present disclosure.

Image processing generally refers to the use of a computer to edit a digital image using an algorithm or a processing network. Many conventional image processing tools and software are catered to highly specialized tasks. Image editing applications may be diverse in terms of specific tasks to be performed. For instance, image editing applications may include tasks such as partial object completion, object removal, object insertion, object replacement, object variations, scene completion, background replacement, background variation, reference-based content generation, texture blending, object blending, etc.

Conventional image processing tools support such varying image editing applications in different models in order to maintain high quality output. For instance, different models may be trained to generate new images that are similar to a set of training images for varying tasks. That is, in order to produce desirable results for specific applications, different models may be used to extract specific features from a specific set of training images and to use such features to generate new images that have similar characteristics, according to the image editing application. However, in some aspects, the use of multiple (e.g., different) models to support different applications/tasks can result in inefficiencies and complexities that can hinder the performance and accuracy of the overall system. As a result, conventional systems may not offer high quality output for certain applications or may be bulky in terms of the number of different models required to maintain high quality output across different applications (e.g., which may drive up costs, slow down processing, etc.). Accordingly, users may struggle to achieve desired results, image processing tools may produce unsatisfactory outputs, etc.

The present disclosure provides different image editing modes in a single image generation network (e.g., a single diffusion-based image model). For example, the single diffusion-based image model described herein may support generic inpainting (ginp), generic outpainting (goup), text-based inpainting (tinp), text-based outpainting (toup), and text to image (text2image). A masking scheme during training is described that supports multiple different applications (e.g., tasks or user cases) and balances the training data among them. Further, a suitable sampling method (e.g., with cropping and dilation techniques) during inference is described, such that optimal quality is obtained for each image editing mode of the image generation network.

Therefore, according to the systems and techniques described herein, different image editing tasks may be resolved using a single model. Such an approach may provide more accurate and reliable system output across a range of user applications, may reduce costs, may improve overall performance, etc.

Embodiments of the present disclosure may be used in the context of various image generation (e.g., various image inpainting and image outpainting) applications. For example, an image processing system based on the present disclosure may implement a single diffusion-based image model to generate output images (e.g., based on user input and image editing modes supported by the image processing system). Example embodiments of the present disclosure in the context of image processing systems are described with reference to FIGS. 1 and 2. Example image editing processes are described in FIGS. 3 and 4, where details regarding example masking processes are provided with reference to FIGS. 5 through 17. Further details regarding example image editing modes are also provided with reference to FIGS. 12 through 15.

Image Processing Systems

FIG. 1 shows an example of an image processing system 100 according to aspects of the present disclosure. The example image processing system 100 shown includes user 105, user device 110, server 115, database 120, and cloud 125. Image processing system 100 is an example of, or includes aspects of, the corresponding element described with reference to FIG. 2.

Embodiments of the present disclosure provide image generation systems and techniques that are efficient (e.g., via a single image generation network, such as a single diffusion-based image inpainting model) and provide high quality output images for multiple different image editing modes (e.g., for different applications such as generic inpainting/outpainting, text-based inpainting/outpainting, etc.). As an example shown in FIG. 1, user 105 may provide an image (e.g., as well as one or more user inputs) in an image processing system 100. In some aspects, the image may be provided that includes a mask region selected by a user. For instance, in the example of FIG. 1, the image may include a background with a brown dog and a mask region (e.g., a user selected mask region indicated in grey color). In some examples, the image and user input (e.g., a user selected mask region, text-based content generation information, etc.) may be transmitted to server 115 (e.g., of image processing system 100), for example, via a user interface implemented on user device 110 and via cloud 125.

For instance, in the example of FIG. 1, user 105 may provide a source image and a selected (or drawn) mask region, as well as a text input (e.g., "a seated wooden cat") that represents or indicates a text-guided content filling. In some examples, the server 115 generates an output image (a completed image, i.e., an inpainted image) as shown in FIG. 1, that represents the image and the text-guided content filling. In other words, the server 115 may provide the user device 110 (e.g., via cloud 125) with an inpainted image based on the masked image, where the output image includes content generated (or inpainted) in the mask region of the source image (e.g., where the output image includes a seated wooden cat as provided in the text-guided input from the user 105, in the example of FIG. 1).

In image processing system 100, user device 110 and/or server 115 may identify the content in the masked region of the input image, desired by the user, and fill the masked region based on the content in the text input. Further, using a generative neural network, image processing system 100 may generate an output image that includes the user-provided image comprising a background with a brown dog and a foreground with a seated wooden cat.

As described herein, image processing system 100 may implement different image editing modes in a single diffusion-based image model (e.g., image generation network 230). Generally, an image editing mode may include, or refer to, one or more processes and/or one or more configurations for image editing. For example, an image editing mode may refer to a configuration (or state) of image editing software and/or hardware that allows specific types of image processing operations to be performed. In some aspects, an image editing mode may correspond to a set of functions or tools that can be used for a particular application (e.g., a set of hardware/software that can be implemented for a particular purpose or type of image editing). For instance, image processing system 100 may include a diffusion-based image model, such as image generation network 230, capable of implementing multiple different image editing modes such as a ginp image editing mode, a goup image editing mode, a tinp image editing mode, a toup image editing mode, and a text2image image editing mode, as described in more detail herein.

In contrast, conventional image processing systems may use different models to support different image editing applications. When conventional image processing systems use multiple machine learning models for each task, there may be a significant amount of redundancy and overlap in the learned representations of the data. This can lead to conventional image processing systems demanding more computational resources, training time, and data storage. Additionally, coordinating and managing multiple models in conventional image processing systems can be more complex and require additional resources and expertise. As such, using a single model (e.g., image generation network 230) to resolve different image editing tasks, according to the systems and techniques described herein, may provide more accurate and reliable system output across a range of user applications, may reduce costs, may improve overall performance, etc.

A user device 110 may include a computing device, personal computer, laptop computer, mainframe computer, palmtop computer, personal assistant, mobile device, or any other suitable processing apparatus. In some examples, the user device 110 includes software that incorporates an image processing application (e.g., an image extending application). The image editing application may either include or communicate with server 115. In some examples, the image extending application on user device 110 may include functions of server 115.

A user interface may enable user 105 to interact with user device 110. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code which is sent to the user device 110 and rendered locally by a browser.

A server 115 provides one or more functions to users 105 linked by way of one or more of the various networks. In some cases, server 115 includes a single microprocessor board, which includes a microprocessor responsible for controlling all aspects of the server 115. In some cases, a server 115 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, server 115 is configured to send and receive hypertext markup language (HTML) formatted files (e.g., for displaying web pages).

In various embodiments, a server 115 comprises a general purpose computing device, a personal computer, a laptop computer, a mainframe computer, a supercomputer, or any other suitable processing apparatus. For example, server 115 may include a processor unit, a memory unit, an I/O module, etc. In some aspects, server 115 may include a computer implemented network. Server 115 may communicate with database 120 via cloud 125. In some cases, the architecture of the image processing network may be referred to as a network or a network model.

Database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, user 105 interacts with database 120 controller. In other cases, database 120 controller may operate automatically without user 105 interaction.

Cloud 125 is a computer network configured to provide on-demand availability of computer system resources, such as data storage and computing power. In some examples, cloud 125 provides resources without active management by user 105. The term cloud 125 is sometimes used to describe data centers available to many users 105 over the Internet. Some large cloud 125 networks have functions distributed over multiple locations from central servers 115. A server 115 is designated an edge server 115 if it has a direct or close connection to a user 105. In some cases, cloud 125 is limited to a single organization. In other examples, cloud 125 is available to many organizations. In one example, cloud 125 includes a multi-layer communications network comprising multiple edge routers and core routers. In another example, cloud 125 is based on a local collection of switches in a single physical location.

Figure 2:
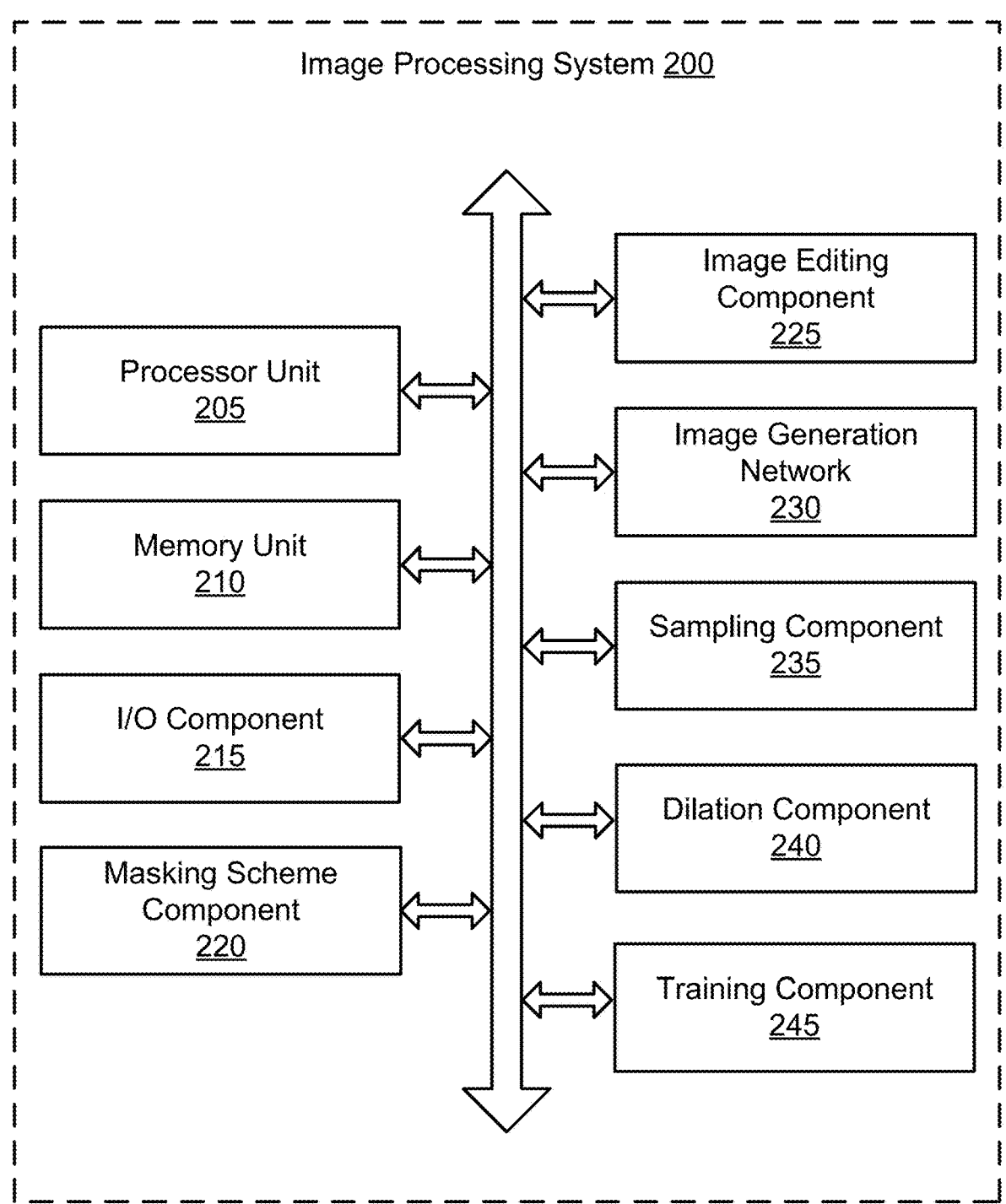
FIG. 2 shows an example of an image processing system according to aspects of the present disclosure.

FIG. 2 shows an example of an image processing system 200 according to aspects of the present disclosure. In some cases, image processing system 200 may also be referred to as image processing apparatus. Image processing system 200 is an example of, or includes aspects of, the corresponding element described with reference to FIG. 1. For example, in some implementations, image processing system 200 may be implemented as user device 110 or as server 115. In some implementations, image processing system 200 may be implemented via a combination of user device 110, server 115, database 120, and cloud 125 (e.g., where components of image processing system 200, and operations performed by image processing system 200, may be distributed across the user device 110, server 115, database 120, and cloud 125 according to various configurations). As described in more detail herein, image processing system 200 may be implemented for various image generation applications (e.g., for diffusion-based image inpainting and outpainting).

According to an embodiment of the present disclosure, image processing system 200 includes processor unit 205, memory unit 210, I/O component 215, masking scheme component 220, image editing component 225, image generation network 230, sampling component 235, dilation component 240, and training component 245.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of a memory unit 210 include random access memory (RAM), read-only memory (ROM), or a hard disk. Examples of memory unit 210 is include solid state memory and a hard disk drive. In some examples, memory unit 210 is used to store computer-readable, computer-executable software including instructions that, when executed, cause a processor unit 205 to perform various functions described herein. In some cases, the memory unit 210 contains, among other things, a basic input/output system (BIOS) which controls basic hardware or software operation such as the interaction with peripheral components or devices. In some cases, a memory controller operates memory cells of memory unit 210. For example, the memory controller can include a row decoder, column decoder, or both. In some cases, memory cells within a memory unit 210 store information in the form of a logical state.

I/O component 215 may manage input and output signals for a device. I/O component 215 may also manage peripherals not integrated into a device. In some cases, an I/O component 215 may represent a physical connection or port to an external peripheral. In some cases, an I/O component 215 may utilize an operating system such as iOS®, ANDROID®, MS-DOS®, MS-WINDOWS®, OS/2®, UNIX®, LINUX®, or another known operating system. In other cases, an I/O component 215 may represent or interact with a modem, a keyboard, a mouse, a touchscreen, or a similar device. In some cases, an I/O component 215 may be implemented as part of a processor unit 205. In some cases, a user may interact with a device via I/O component 215 or via hardware components controlled by an I/O component 215.

According to some embodiments of the present disclosure, image processing system 200 includes a computer implemented artificial neural network (ANN) for image generation (e.g., in some aspects, image generation network 230 may include an ANN). An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, masking scheme component 220 obtains an input image and a mask indicating an edit region of the image. In some examples, masking scheme component 220 identifies a mask type corresponding to the mask and the image editing mode, where the output image is generated based on the mask type. In some aspects, the mask type is selected from a set of mask types including an object inpainting mask type, a texture inpainting mask type, an outpainting mask type, a shape guidance mask type, or any combination thereof.

According to some aspects, image editing component 225 identifies an image editing mode. In some aspects, the network (e.g., image generation network 230) may handle (e.g., operate in) a text-free mode and a text-guided mode (e.g., or a text-based image editing mode, which may include different subtypes based on similarity levels, as described in more detail herein). In some examples, image editing component 225 obtains a text prompt, where the image editing mode includes a text-based image editing mode and the output image is generated based on the text prompt. In some examples, image editing component 225 identifies a text based inpainting similarity mode, where the output image is generated based on the text based inpainting similarity mode. In some aspects, the text based inpainting similarity mode includes a scene brush mode, an object brush mode, or a texture brush mode. In some examples, image editing component 225 identifies a set of conditions corresponding to the image editing mode. In some examples, image editing component 225 computes a conditional embedding based on the set of conditions where the output image is generated based on the conditional embedding.

In some aspects, image generation network 230 is a type of artificial neural network that can generate new data based on patterns it has learned from a training dataset. For example, unlike some discriminative neural networks, which are designed to classify or label input data, generative neural network 230 may generate new data that is similar to training data.

In some cases, image generation network 230 is a generative model used in machine learning and statistics to generate data that is similar to the data on which the model is trained.

In some cases, image generation network 230 may include a Generative Adversarial Network (GAN) architecture. A GAN is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution).

Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

Once the image generation network 230 (e.g., a generator of image generation network 230) has been trained, the image generation network 230 can generate new images by sampling random noise from a normal distribution and passing it through the image generation network 230. The generator may then output an image that has similar patterns and features to the training data, but is new and unique.

According to some aspects, image generation network 230 generates an output image based on the input image, the mask, and the image editing mode. In some aspects, the image generation network 230 is trained using a set of training data sets corresponding to the set of mask types, respectively. In some aspects, the output image corresponds to the input image in a region outside of the edit region and includes generated content within the edit region.

In some aspects, as described in more detail herein, image generation network 230 may include (e.g., represent) a single diffusion-based image model. By using a single image model for multiple tasks, it may be possible to learn more robust representations of the data that can be reused across tasks. This can reduce redundancy and improve efficiency, which may lead to faster training times, lower resource requirements, reduced complexity, etc. Furthermore, a single model (e.g., image generation network 230) may be able to leverage correlations and dependencies between tasks to improve performance and accuracy.

According to some aspects, sampling component 235 computes a guidance sampling value based on a set of parameters including an image parameter, a mask parameter, a text parameter, a reference image parameter, a mask mode parameter, or any combination thereof.

According to some aspects, dilation component 240 identifies a dilation parameter. In some examples, dilation component 240 generates a partial image based on the mask and the dilation parameter. In some examples, dilation component 240 combines the input image and the partial image to obtain the output image.

According to some aspects, training component 245 obtains training data including a set of training samples corresponding to a set of image editing modes, respectively. In some examples, training component 245 trains image generation network 230 to generate output images corresponding to each of the set of image editing modes using the training data. In some examples, training component 245 identifies a set of conditions corresponding to each of the set of image editing modes. In some examples, training component 245 generates a conditional embedding based on the set of conditions for each of the training samples, where image generation network 230 is trained based on the conditional embedding. In some aspects, a first sample of the set of training samples includes a text-based sample and a second sample of the set of training samples includes a text-free sample. In some aspects, a first sample of the set of training samples includes an inpainting sample and a second sample of the set of training samples includes an outpainting sample.

Figure 3:
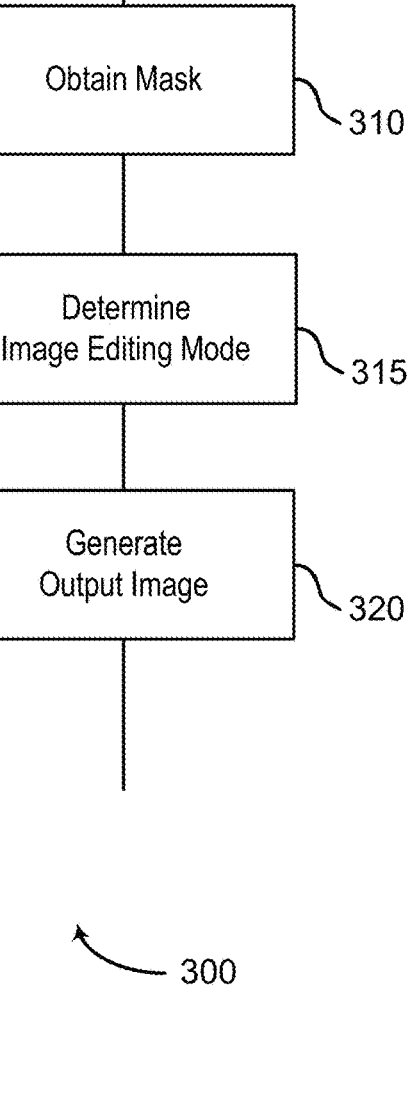
FIG. 3 shows an example of an image generation process according to aspects of the present disclosure.

FIG. 3 shows an image generation process 300 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system obtains an image (e.g., an input image). For example, a user may send an input image to a server. In some cases, the operations of this step refer to, or may be performed by, a user device as described with reference to FIG. 1. In some cases, the operations of this step refer to, or may be performed by, a server as described with reference to FIG. 1. In some cases, the operations of this step refer to, or may be performed by, an image editing component as described with reference to FIG. 2. In some cases, the image is submitted by the user for completion based on a desired text description. For instance, in the example of FIG. 3, the image may include a background with a brown dog.

At operation 310, the system obtains a mask (e.g., a mask indicating an edit region of the image). For example, a user may provide (e.g., send) a mask to the server in addition to the input image. In some cases, the operations of this step refer to, or may be performed by, a user device as described with reference to FIG. 1. In some cases, the operations of this step refer to, or may be performed by, a server as described with reference to FIG. 1. In some cases, the operations of this step refer to, or may be performed by, a masking scheme component as described with reference to FIG. 2. For example, the mask may cover a portion of the image (e.g., input image) that the user wants to change/replace (i.e., based on inpainting or outpainting). Further details regarding obtaining a masked image or a masked region in the input image are provided with reference to FIGS. 5-11.

At operation 315, the system determines an image editing mode (e.g., based on the obtained image or an image type of the obtained image, based on the obtained mask, based on a task selected by the user, based on a text prompt indicated by the user, etc.). In some cases, the operations of this step refer to, or may be performed by, a user device as described with reference to FIG. 1. In some cases, the operations of this step refer to, or may be performed by, a server as described with reference to FIG. 1. In some cases, the operations of this step refer to, or may be performed by, an image editing component as described with reference to FIG. 2. For example, the user may want to perform image editing based on a text prompt. Accordingly, the user may specify text for filling content in the masked region of the image. For example, referring to the example in FIG. 1, the user may provide text prompt "a seated wooden cat" for image generation.

At operation 320, the system generates an output image (e.g., based on the obtained input image, the obtained mask, and the determined image editing mode). In some cases, the operations of this step refer to, or may be performed by, a server as described with reference to FIG. 1. In some cases, the operations of this step refer to, or may be performed by, an image generation network as described with reference to FIG. 2. In some cases, the image generation network of the image processing system may take the user provided image and the text prompt to generate an output image. The output image is presented to the user (e.g., via a user interface). The output image includes the user provided image and the masked region of the image that is filled based on the text prompt provided by the user.

Figure 4:
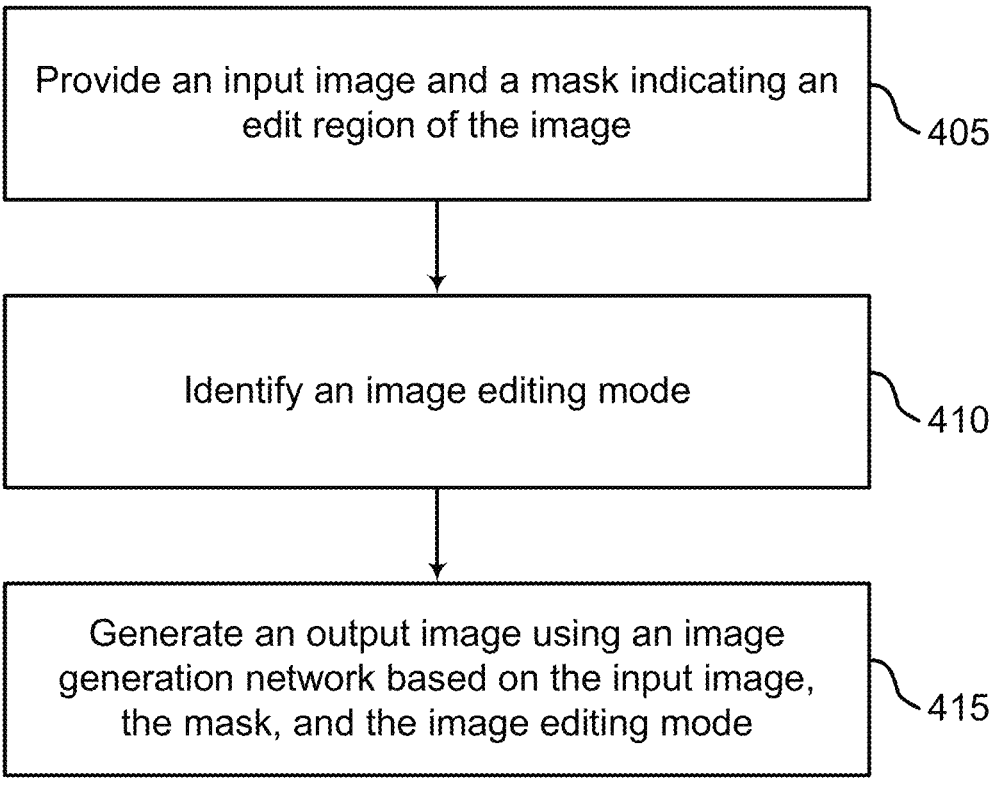
FIG. 4 shows an example of a method for image processing according to aspects of the present disclosure.

FIG. 4 shows an example of a method 400 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system provides (e.g., obtains) an input image and a mask indicating an edit region of the image. For example, at operation 405, a user my provide the input image and the mask, a user my provide the input image and the system may obtain the mask based on the provided image, the system may obtain the input image from a database and the user may provide the mask corresponding to the obtained input image, the system may obtain the input image and the mask from a database, etc. In some cases, the operations of this step refer to, or may be performed by, a masking scheme component as described with reference to FIG. 2. In some cases, the input image and the mask are provided by the user. In some cases, the input image and the mask are provided to the image processing system (e.g., via a database of the image processing system or a database in connection with the image processing system).

At operation 410, the system identifies an image editing mode. In some cases, the operations of this step refer to, or may be performed by, an image editing component as described with reference to FIG. 2. In some examples, the image editing mode is based on, but not necessarily limited to, the obtained image or an image type of the obtained image, the obtained mask, a task selected by the user, a text prompt indicated by the user, etc. Further details regarding the operation of the image editing mode are provided with reference to FIGS. 12-17.

At operation 415, the system generates an output image using an image generation network based on the input image, the mask, and the image editing mode. In some cases, the operations of this step refer to, or may be performed by, an image generation network as described with reference to FIG. 2. For instance, the generated output image is a high-quality image that includes the input image provided by the user and content filled in the mask region of the image based on the identified image editing mode.

Therefore, a method, apparatus, and non-transitory computer readable medium for masking and sampling scheme design in a diffusion-based inpainting/outpainting model are described. One or more aspects of the method, apparatus, and non-transitory computer readable medium include obtaining an input image and a mask indicating an edit region of the image; identifying an image editing mode; and generating an output image using an image generation network based on the input image, the mask, and the image editing mode.

Some examples of the method, apparatus, non-transitory computer readable medium, and system further include identifying a mask type corresponding to the mask and the image editing mode, wherein the output image is generated based on the mask type. In some aspects, the mask type is selected from a plurality of mask types including an object inpainting mask type, a texture inpainting mask type, an outpainting mask type, a shape guidance mask type, or any combination thereof. In some aspects, the image generation network is trained using a plurality of training data sets corresponding to the plurality of mask types, respectively.

Some examples of the method, apparatus, non-transitory computer readable medium, and system further include obtaining a text prompt, wherein the image editing mode comprises a text-based image editing mode and the output image is generated based on the text prompt. In some aspects, the output image corresponds to the input image in a region outside of the edit region and includes generated content within the edit region.

Some examples of the method, apparatus, non-transitory computer readable medium, and system further include computing a guidance sampling value based on a plurality of parameters including an image parameter, a mask parameter, a text parameter, a reference image parameter, a mask mode parameter, or any combination thereof.

Some examples of the method, apparatus, non-transitory computer readable medium, and system further include identifying a text based inpainting similarity mode, wherein the output image is generated based on the text based inpainting similarity mode. In some aspects, the text based inpainting similarity mode comprises a scene brush mode, an object brush mode, or a texture brush mode.

Some examples of the method, apparatus, non-transitory computer readable medium, and system further include identifying a dilation parameter. Some examples further include generating a partial image based on the mask and the dilation parameter. Some examples further include combining the input image and the partial image to obtain the output image. Some examples of the method, apparatus, non-transitory computer readable medium, and system further include identifying a plurality of conditions corresponding to the image editing mode. Some examples further include computing a conditional embedding based on the plurality of conditions wherein the output image is generated based on the conditional embedding.

Image Masking Processes

FIGS. 5-11 show example mask types (e.g., and input, or training data, to an image generation network during training) according to one or more aspects of the present disclosure. For example, FIGS. 5-11 show example original images (e.g., via input images 505, 605, 705 . . . etc.), example object segmentation masks (e.g., via segmentation images 510, 610, 710 . . . etc.), example process inpainting masks (e.g., masks for training 515, 615, 715 . . . etc.), and masked images (e.g., masked images 520, 620, 720 . . . etc.). For instance, the masks for training 515-1115 may show example process inpainting masks (e.g., after random generation, dilation and random augmentation) and the masked images 520-1120 may illustrate overlapping of inpainting masks on top of original images 505-1105, respectively. In some aspects, the masks for training 515-1115 and masked images 520-1120 may show examples of training data (e.g., inputs to the network, such as an image generation network, during training). Further, FIGS. 6-11 also include example text prompts (e.g., for text-based image editing modes, etc.).

In certain aspects, mask types 500-1100 may show examples of mask types that may correspond to masks (e.g., user generated masks or user selected masks). For instance, obtained masks may be processed using an image editing mode corresponding to a mask type associated with the obtained mask. In certain aspects, mask types 500-1100 may show examples of mask types that may correspond to image editing modes (e.g., as certain mask types may be used to train different image editing modes). Accordingly, output images may be generated based on mask types 500-1100. In some cases, mask types described herein may include mask subtypes. In some aspects, mask subtypes may include or refer to a set of masks or mask categories within a mask type (e.g., where a mask subtype may correspond to certain tasks or applications within an image editing mode corresponding to the broader mask type).

Figure 5:
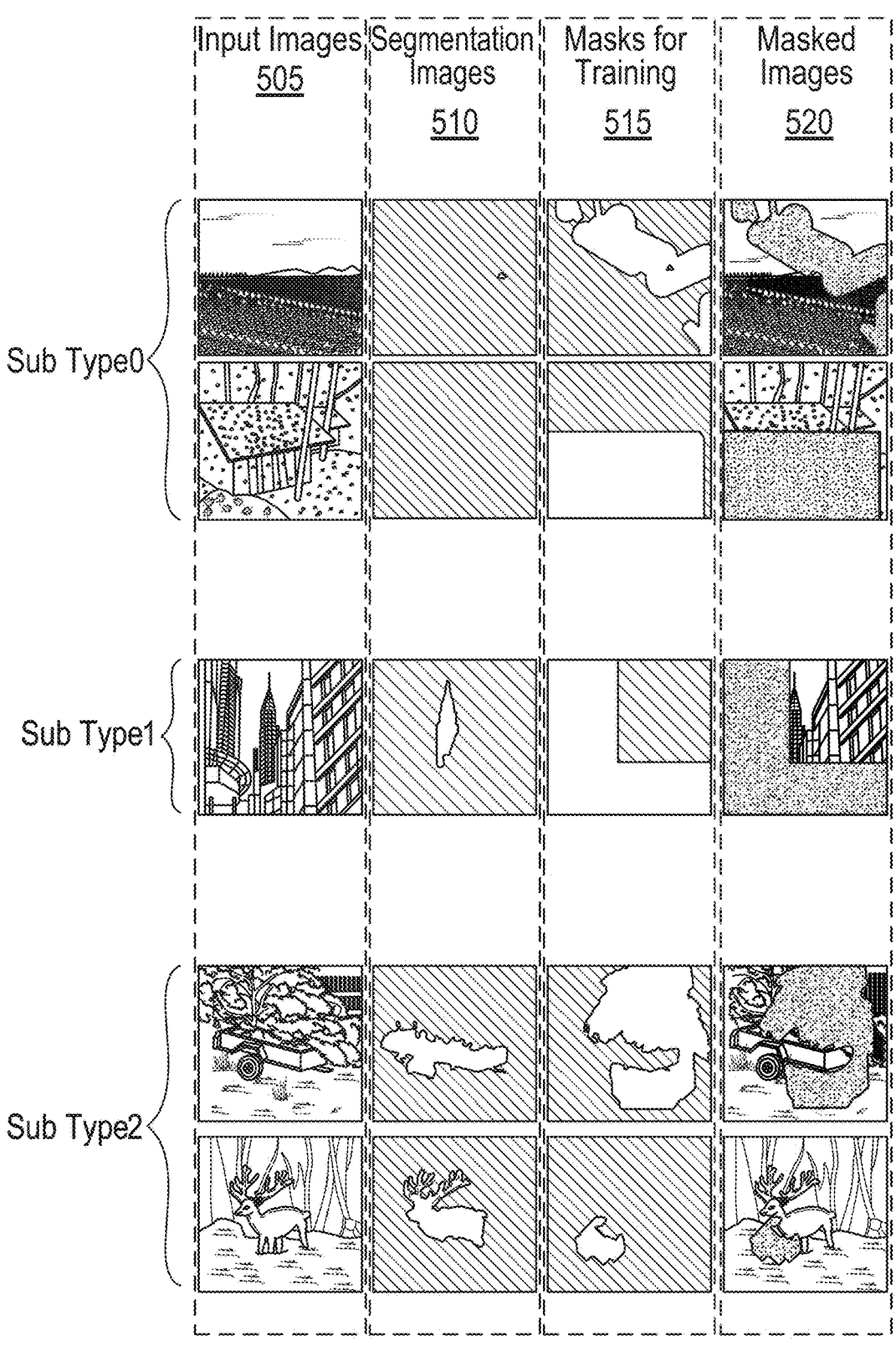

FIG. 5 shows an example of a mask type 500 (e.g., which may be an example of a Mask Type 0 in Table 1) according to aspects of the present disclosure. Mask type 500 is an example of, or includes aspects of, the corresponding element described with reference to FIGS. 6-11, 16, and 17. In one aspect, mask type 500 includes input images 505, segmentation images 510, masks for training 515, and masked images 520. In one aspect, mask type 500 may be processed using a ginp image editing mode and/or a goup image editing mode. In one aspect, mask type 500 may be used to train a ginp image editing mode and/or a goup image editing mode. In certain aspects, mask type 500 may include, or be associated with, mask subtypes (e.g., such as SubType 0: pure natural background with null/tiny objects, SubType1: outpainting, SubType2: object-aware inpainting).

In digital imaging, a pixel (or picture element) refers to the smallest addressable element in a display device, and the smallest controllable element of a picture represented on the device. In some cases, each pixel may represent a sample of an original image. The color and intensity of each pixel is variable. In color imaging systems, a color may be represented by three or four component intensities such as red, green, and blue, or cyan, magenta, yellow, and black.

In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics. In some aspects, segmentation images described herein (e.g., segmentation images 510, segmentation images 610, etc.) may be generated or represented using image segmentation techniques.

A mask (e.g., a mask type 500, a mask for training 515, etc.) may refer to a binary or Boolean array that may be used to selectively apply or ignore specific values during a computation (e.g., during an image editing computation). A mask may be used for a variety of purposes, such as to filter out certain input features, to limit the impact of certain data points on the model's training, etc. For example, a mask may be used to specify which regions of an input image should be ignored during training, such as areas that contain irrelevant or noisy data. A mask may allow the selective manipulation of data, enabling models to focus on the most relevant information and reduce the impact of noisy or irrelevant data.

In some aspects, mask types described herein may include collecting images, performing image segmentation, generating masks, and then using the mask for training. A set of images (e.g., input images 505) may be collected along with their corresponding ground truth labels that indicate which pixels in the image correspond to each object or part of an object. An image segmentation techniques (e.g., an image segmentation algorithm) may be applied to each image in the dataset to partition it into multiple segments that correspond to different objects or parts of objects (e.g., to generate segmented images 510). Once the image has been segmented (e.g., once segmented images 510 are generated or identified), masks for training 515 may be generated (e.g., for each segment by assigning a binary value, 0 or 1, to each pixel in the segment depending on whether it corresponds to the object or not). The generated masked images 520 can be used (e.g., for training the image generation network).

Referring to FIG. 5, "SubType0" refers to input images 505 with "pure natural background with null/tiny objects". Similarly, "SubType1" refers to "outpainting" in a portion of input images 505 and "SubType2" refers to "object-aware inpainting". Image segmentation is performed on input images 505 to generate segmentation images 510. As shown in FIG. 5, segmentation images 510 show input images 505 that are partitioned to locate objects (e.g., person, cart, etc.). Input images 505 may be examples of, or include aspects of, the corresponding elements described with reference to FIGS. 6-17. Segmentation images 510 may be examples of, or include aspects of, the corresponding elements described with reference to FIGS. 6-11.

Additionally, an image processing system (e.g., image processing system 200) provides masks for training 515 that indicate an edit region of input images 505. In some examples, the masks for training are obtained by a masking scheme component (e.g., masking scheme component 220 of image processing system 200 as described with reference to FIG. 2). As an example shown in FIG. 5, masks for training 515 show an arbitrary shaped region to be masked in "SubType0". Similarly, masks for training 515 for "Sub-Type1" identify a region on the side and bottom edge (i.e., outpainted region) that is to be masked. "SubType2" provides a region around the object that is to be masked. Masks for training 515 may be examples of, or include aspects of, the corresponding elements described with reference to FIGS. 6-11.

The image generation network (e.g., image generation network 230 of image processing system 200) generates masked images 520 that include content of input images 505 and masks for training 515. Referring again to FIG. 5, masked images 520 show a masked region on input images 505 for each of "SubType0", "SubType1", and "SubType2".

Masked images 520 may be examples of, or include aspects of, the corresponding elements described with reference to FIGS. 6-11.

According to an embodiment of the present disclosure, image processing system 200 (as described with reference to FIG. 2) performs image inpainting without using text input as guidance information. Mask type 500 is trained with object-aware masks and fixed prompt embeddings. In some cases, mask type 500 can avoid generating unexpected objects in the hole region.

In some aspects, a hole region refers to a connected component within an image that is surrounded by foreground pixels (e.g., object pixels) but does not contain any foreground pixels itself. In some aspects, a hole region is a region of pixels that is surrounded by object pixels. Hole regions may occur in various image processing tasks, such as object detection, segmentation, and image inpainting. In some cases, hole regions may be identified using algorithms that analyze the connectivity of foreground and background pixels within an image.

Figure 6:
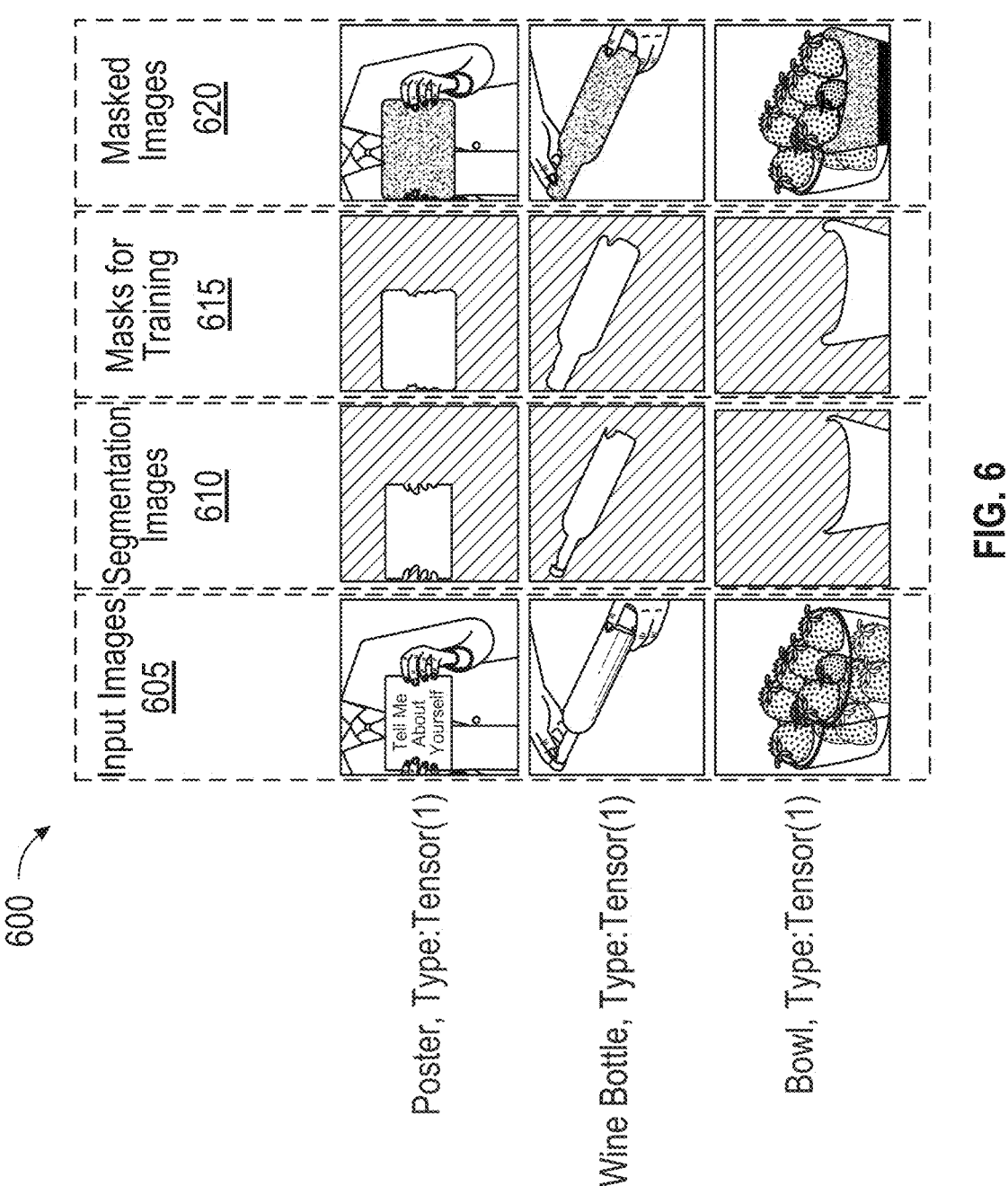

FIG. 6 shows an example of a mask type 600 (e.g., which may be an example of a Mask Type 1 in Table 1) according to aspects of the present disclosure. Mask type 600 is an example of, or includes aspects of, the corresponding element described with reference to FIGS. 5, 7-11, 16, and 17. In one aspect, mask type 600 includes input images 605, segmentation images 610, masks for training 615, and masked images 620. In one aspect, mask type 600 may be processed using a tinp image editing mode. In one aspect, mask type 600 may be used to train a tinp image editing mode.

Input images 605 may be examples of, or include aspects of, the corresponding elements described with reference to FIGS. 5, and 7-17. Segmentation images 610 may be examples of, or include aspects of, the corresponding elements described with reference to FIGS. 5, and 7-11. Masks for training 615 may be examples of, or include aspects of, the corresponding elements described with reference to FIGS. 5, and 7-11. Masked images 620 may be examples of, or include aspects of, the corresponding elements described with reference to FIGS. 5, and 7-11. The descriptions of input image, segmentation image, mask for training, and masked image described with reference to FIG. 6 are similar to FIG. 5, and hence repeated descriptions are omitted for brevity.

FIG. 6 shows an example mask type 600 that is applied for various example input images 605. In the example of FIG. 6, mask type 600 is shown for examples including a poster, a wine bottle, and a bowl as input images 605. In some cases, masks for training 615 tightly follow the information provided in segmentation images 610. For instance, referring to "poster", masks for training 615 accurately describes the shape of the object to be masked provided by segmentation images 610. Thus, masks for training 615 capture the shape of the object with each detail (e.g., masks for training capture distinct fingers of the person in the example of "poster").

According to an embodiment of the present disclosure, image processing system (e.g., image processing system 200) performs inpainting with shape guidance. In some cases, a user draws a shape (e.g., an exact shape) of the object and desires a masked image that follows the shape guidance. In some cases, mask type 600 is trained with a segmentation mask and the generated objects closely or tightly follow the shape of the drawn masks.

Figure 7:
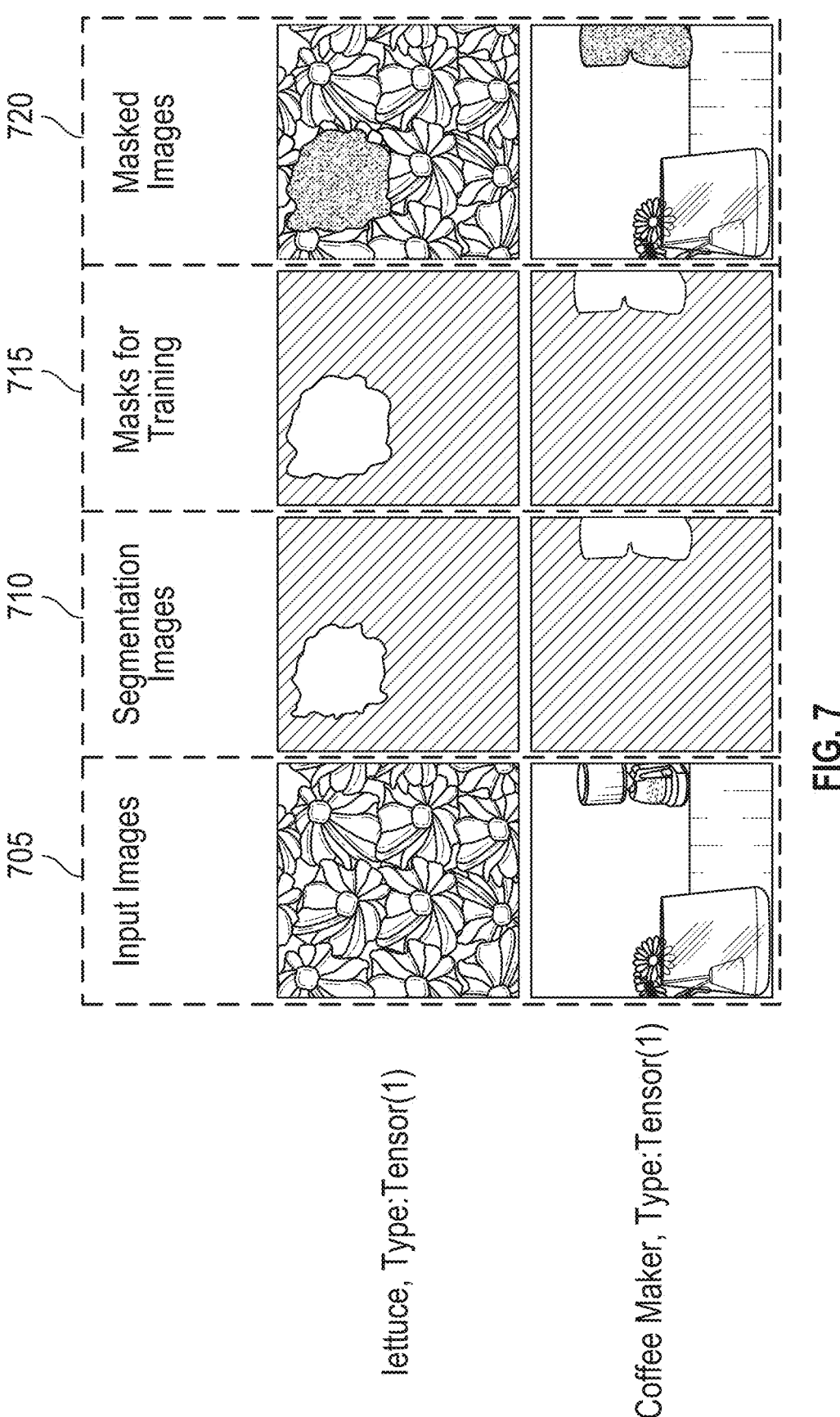

FIG. 7 shows an example of a mask type 700 (e.g., which may be an example of a Mask Type 1 in Table 1) according to aspects of the present disclosure. Mask type 700 is an example of, or includes aspects of, the corresponding element described with reference to FIGS. 5, 6, 8-11, 16, and 17. In one aspect, mask type 700 includes input images 705, segmentation images 710, masks for training 715, and masked images 720. In one aspect, mask type 700 may be processed using a tinp image editing mode. In one aspect, mask type 700 may be used to train a tinp image editing mode.

Input images 705 may be examples of, or include aspects of, the corresponding elements described with reference to FIGS. 5, 6, and 8-17. Segmentation images 710 may be examples of, or include aspects of, the corresponding elements described with reference to FIGS. 5, 6, and 8-11. Masks for training 715 may be examples of, or include aspects of, the corresponding elements described with reference to FIGS. 5, 6, and 8-11. Masked images 720 may be examples of, or include aspects of, the corresponding elements described with reference to FIGS. 5, 6, and 8-11. The descriptions of input image, segmentation image, mask for training, and masked image described with reference to FIG. 7 are similar to FIG. 5, and hence repeated descriptions are omitted for brevity.

FIG. 7 shows an example mask type 700 that is applied for various example input images 705. In the example of FIG. 7, mask type 700 is shown for examples including lettuce and a coffee maker as input images 705. In some cases, masks for training 715 loosely follow the information provided in segmentation images 710. For instance, referring to "lettuce", masks for training 715 loosely describes the shape of the object to be masked provided by segmentation images 710. Thus, masks for training 715 capture an overall shape of the lettuce with high-level information (i.e., without capturing the exact shape or details).

According to an embodiment of the present disclosure, image processing system (e.g., image processing system 200) performs inpainting with shape guidance. In some cases, a user draws a shape (e.g., an approximate shape) of the object and desires a masked image that loosely follows the shape guidance. In some cases, mask type 700 is trained with a coarse segmentation mask and the generated objects coarsely follow the shape of the drawn masks.

Figure 8:
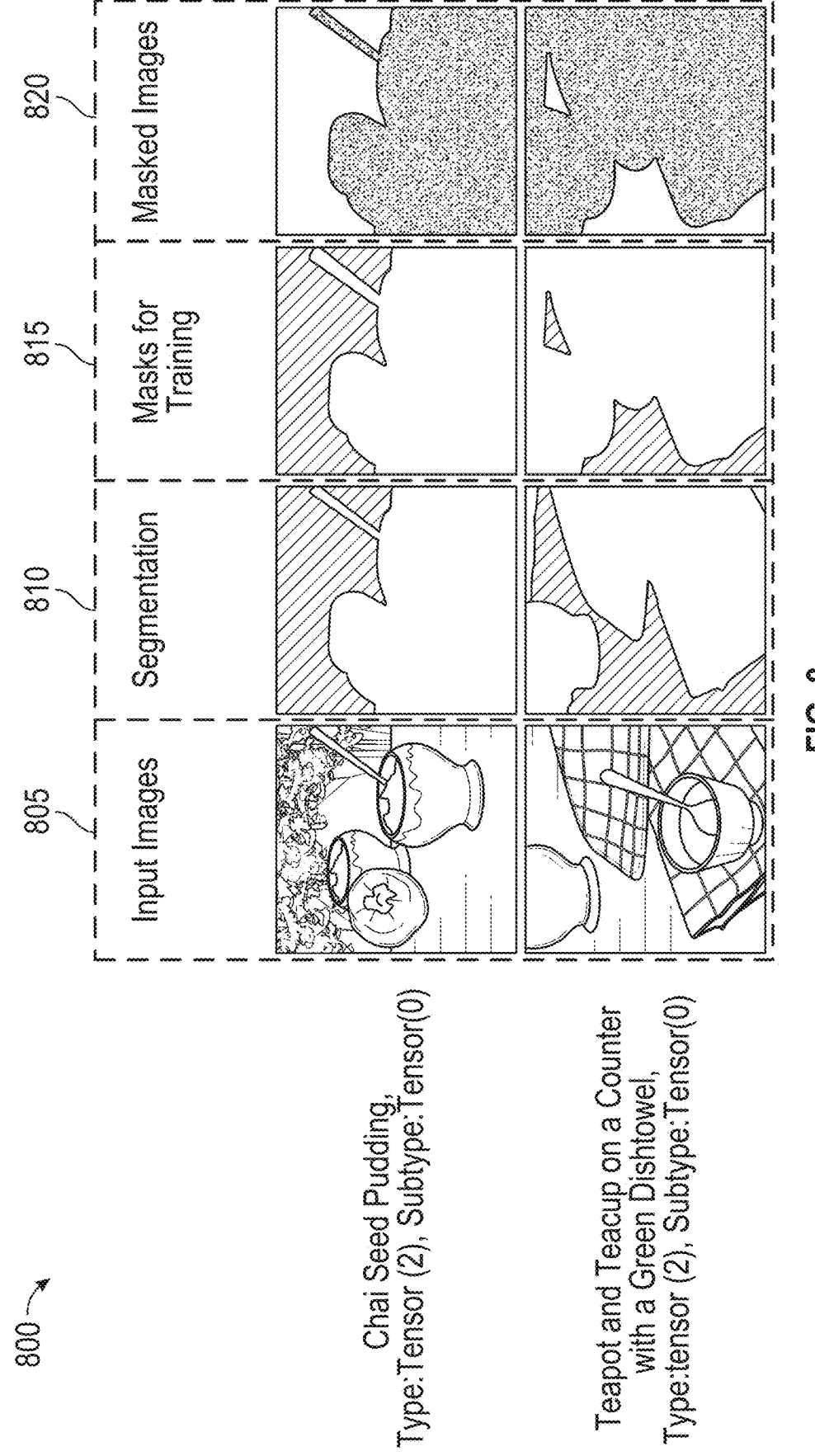

FIG. 8 shows an example of a mask type 800 (e.g., which may be an example of a subtype of a Mask Type 2 in Table 1) according to aspects of the present disclosure. Mask type 800 is an example of, or includes aspects of, the corresponding element described with reference to FIGS. 5-7, 9-11, 16, and 17. In one aspect, mask type 800 includes input images 805, segmentation images 810, masks for training 815, and masked images 820. In one aspect, mask type 800 may be processed using a tinp image editing mode, a toup image editing mode, and/or a text2image image editing mode. In one aspect, mask type 800 may be used to train a tinp image editing mode, a toup image editing mode, and/or a text2image image editing mode.

Input images 805 may be examples of, or include aspects of, the corresponding elements described with reference to FIGS. 5-7, and 9-17. Segmentation images 810 may be examples of, or include aspects of, the corresponding elements described with reference to FIGS. 5-7, and 9-11. Masks for training 815 may be examples of, or include aspects of, the corresponding elements described with reference to FIGS. 5-7, and 9-11. Masked images 820 may be examples of, or include aspects of, the corresponding elements described with reference to FIGS. 5-7, and 9-11. The descriptions of input image, segmentation image, mask for training, and masked image described with reference to FIG. 8 are similar to FIG. 5, and hence repeated descriptions are omitted for brevity.

One or more embodiments of the present disclosure include an image processing system configured to perform inpainting without shape constraints. In some cases, the image processing system performs text-based editing. In some cases, text-based editing includes text2image generation, background replacement, text-based outpainting, background region replacement, object insertion, etc. According to some embodiments, mask type 800 is jointly trained based on text-based inpainting.

FIG. 8 shows an example mask type 800 that is applied for various example input images 805. In the example of FIG. 8, mask type 800 is shown for examples of "SubType0" including examples of "chia seed pudding" and "teapot and teacup on a counter with a green dishtowel" as input images 805. Image processing system (e.g., image processing system 200) performs generic image editing using merged entity masks while incorporating shape randomness. In some cases, such generic image editing is performed using text that provides a description of a scene. As an example shown in FIG. 8, 40% of shape randomness is added for merged entity masks. In some cases, masks for training 815 enable inpainting without shape constraints.

Referring to FIG. 8, image processing system generates merged masks that cover each object (e.g., "teapot", "teacup", "green dishtowel") provided in the text, i.e., "teapot and teacup on a counter with a green dishtowel" and loosely follows the information provided by segmentation image 810. Accordingly, masked images 820 include the merged mask in input images 805 that is used for generic image editing.

Figure 9:
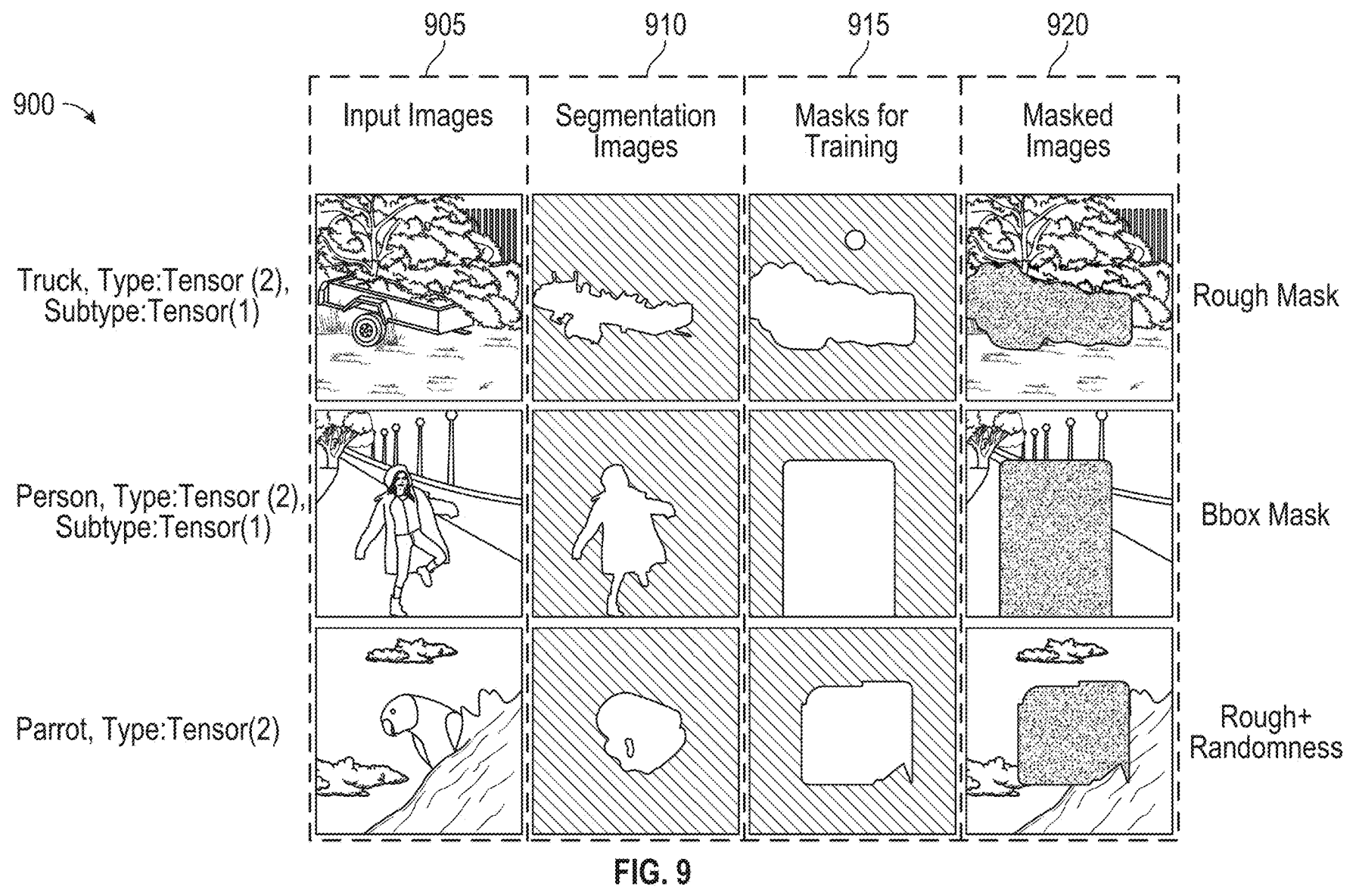

FIG. 9 shows an example of a mask type 900 (e.g., which may be an example of a Mask Type 2 in Table 1) according to aspects of the present disclosure. Mask type 900 is an example of, or includes aspects of, the corresponding element described with reference to FIGS. 5-8, 10, 11, 16, and 17. In one aspect, mask type 900 includes input images 905, segmentation images 910, masks for training 915, and masked images 920. In one aspect, mask type 900 may be processed using a tinp image editing mode, a toup image editing mode, and/or a text2image image editing mode. In one aspect, mask type 900 may be used to train a tinp image editing mode, a toup image editing mode, and/or a text2image image editing mode.

Input images 905 may be examples of, or include aspects of, the corresponding elements described with reference to FIGS. 5-8, and 10-17. Segmentation images 910 may be examples of, or include aspects of, the corresponding elements described with reference to FIGS. 5-8, 10, and 11. Masks for training 915 may be examples of, or include aspects of, the corresponding elements described with reference to FIGS. 5-8, 10, and 11. Masked images 920 may be examples of, or include aspects of, the corresponding elements described with reference to FIGS. 5-8, 10, and 11. The descriptions of input image, segmentation image, mask for training, and masked image described with reference to FIG. 9 are similar to FIG. 5, and hence repeated descriptions are omitted for brevity.

One or more embodiments of the present disclosure include an image processing system configured to perform inpainting without shape constraints and text-based editing. In some cases, text-based editing includes text2image generation, background replacement, text-based outpainting, background region replacement, object insertion, etc. According to some embodiments, mask type 900 is jointly trained based on text-based inpainting.

FIG. 9 shows an example mask type 900 that is applied for various example input images 905. In the example of FIG. 9, mask type 900 is shown for examples of "SubType1" including "truck", "person", and "parrot" as input images 905. As seen in FIG. 9, the text description provides an object. In some cases, image processing system (e.g., image processing system 200) performs object insertion based on single entity mask while incorporating shape randomness.

As an example shown in FIG. 9, 40% of shape randomness is added for single entity masks.

In some cases, masks for training 915 enable inpainting without shape constraints. Referring to FIG. 9, image processing system generates single entity masks that cover the object (e.g., "truck", "person", and "parrot") provided in the text. Accordingly, masked images 920 include the single entity mask in input images 905 that are used for object insertion. In some cases, an image processing system may generate masked images 920 with different types of masks covering the object provided in input images 905. For example, masked image corresponding to "truck" is a rough mask. Masked image corresponding to "person" is a Bbox (i.e., bounding box) mask. Masked image corresponding to "parrot" is a rough mask with added shape randomness.

Figure 10:
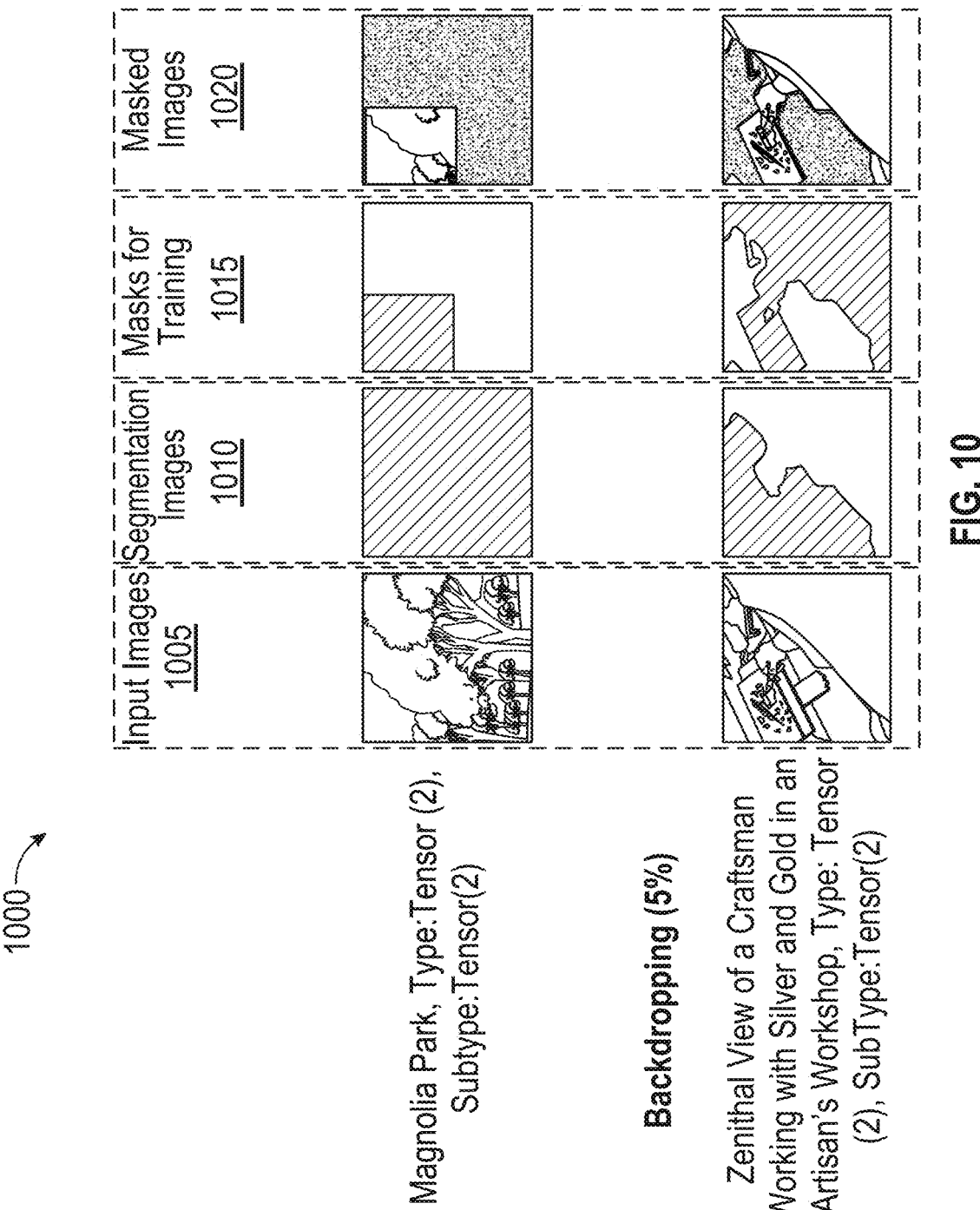

FIG. 10 shows an example of a mask type 1000 (e.g., which may be an example of a Mask Type 2 in Table 1) according to aspects of the present disclosure. Mask type 1000 is an example of, or includes aspects of, the corresponding element described with reference to FIGS. 5-9, 11, 16, and 17. In one aspect, mask type 1000 includes input images 1005, segmentation images 1010, masks for training 1015, and masked images 1020. In one aspect, mask type 1000 may be processed using a tinp image editing mode, a toup image editing mode, and/or a text2image image editing mode. In one aspect, mask type 1000 may be used to train a tinp image editing mode, a toup image editing mode, and/or a text2image image editing mode.

Input images 1005 may be examples of, or include aspects of, the corresponding elements described with reference to FIGS. 5-9, and 11-17. Segmentation images 1010 may be examples of, or include aspects of, the corresponding elements described with reference to FIGS. 5-9, and 11. Masks for training 1015 may be examples of, or include aspects of, the corresponding elements described with reference to FIGS. 5-9, and 11. Masked images 1020 may be examples of, or include aspects of, the corresponding elements described with reference to FIGS. 5-9, and 11. The descriptions of input image, segmentation image, mask for training, and masked image described with reference to FIG. 10 are similar to FIG. 5, and hence repeated descriptions are omitted for brevity.

FIG. 10 shows an example mask type 1000 that is applied for various example input images 1005. In the example of FIG. 10, mask type 1000 is shown for examples of "Sub-Type2" including "magnolia park" and "zenithal view of a craftsman working with silver and gold in an artisan's workshop" as input images 1005. As seen in FIG. 10, the text description provides a scene or the overall description of input images 1005. In some cases, image processing system (e.g., image processing system 200) performs image outpainting or backdropping. In some examples, image outpainting comprises larger ratios than generic image editing (as described with reference to FIG. 8). As an example shown in FIG. 10, backdropping is less than or equal to 10%.

According to an embodiment of the present disclosure, the image processing system is configured to perform image outpainting without shape constraints and text-based editing. In some cases, text-based editing includes text2image generation, background replacement, text-based outpainting, background region replacement, object insertion, etc. According to some embodiments, mask type 1000 is jointly trained based on text-based inpainting.

In some cases, masks for training 1015 enable outpainting in large regions. Referring to FIG. 10, masks for training 1015 are configured to mask large regions in segmentation images 1010. Accordingly, masked image 1020 includes a mask in a large region of input image 1005. For example, masked image 1020 corresponding to "magnolia park" shows a large region of input image 1005 that is covered by mask (indicated in pink color).

Figure 11:
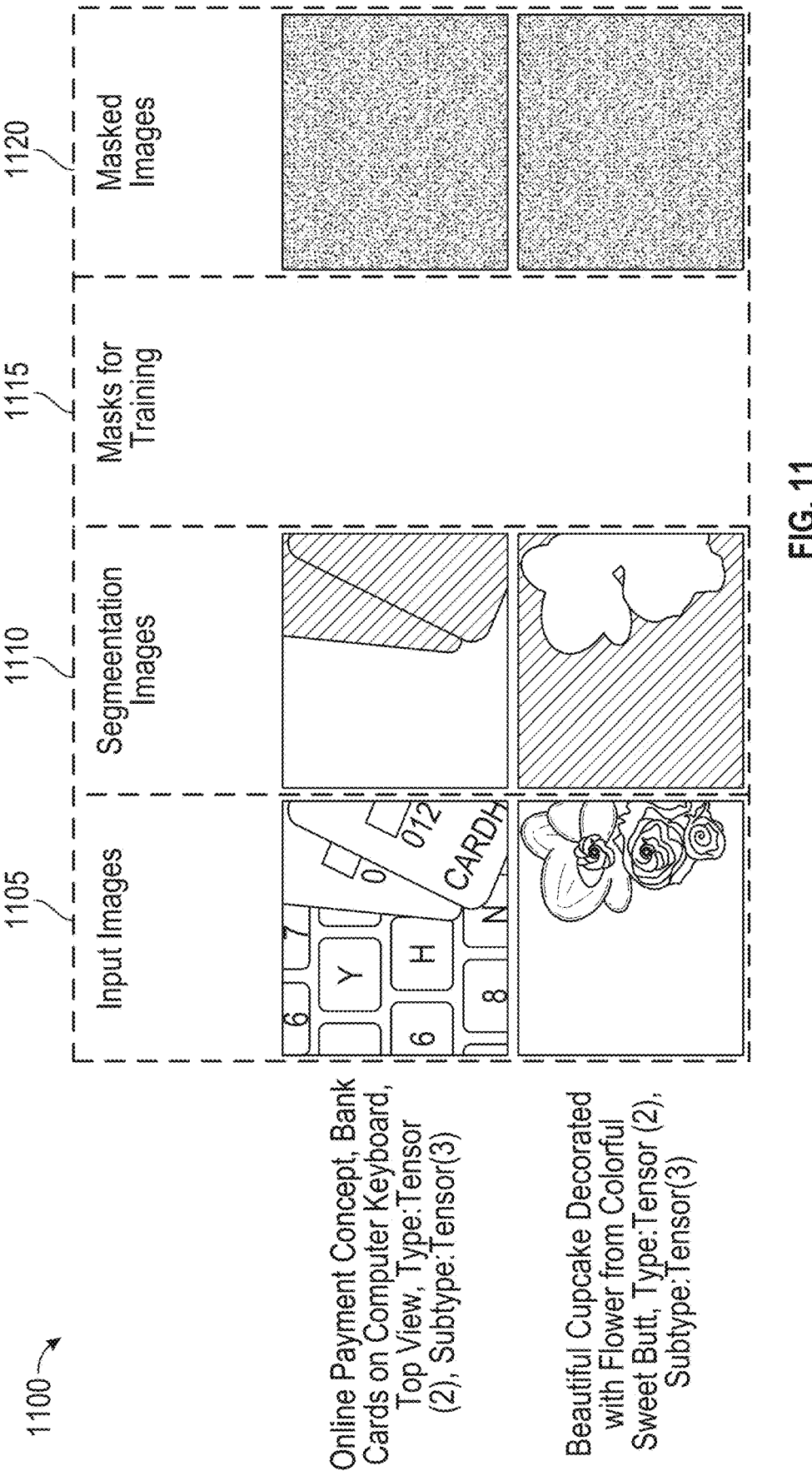

FIG. 11 shows an example of a mask type 1100 (e.g., which may be an example of a Mask Type 2 in Table 1) according to aspects of the present disclosure. Mask type 1100 is an example of, or includes aspects of, the corresponding element described with reference to FIGS. 5-10, 16, and 17. In one aspect, mask type 1100 includes input images 1105, segmentation images 1110, masks for training 1115, and masked images 1120. In one aspect, mask type 1100 may be processed using a tinp image editing mode, a toup image editing mode, and/or a text2image image editing mode. In one aspect, mask type 1100 may be used to train a tinp image editing mode, a toup image editing mode, and/or a text2image image editing mode.

Input images 1105 may be examples of, or include aspects of, the corresponding elements described with reference to FIGS. 5-10, and 12-17. Segmentation images 1110 may be examples of, or include aspects of, the corresponding elements described with reference to FIGS. 5-10. Masks for training 1115 may be examples of, or include aspects of, the corresponding elements described with reference to FIGS. 5-10. Masked images 1120 may be examples of, or include aspects of, the corresponding elements described with reference to FIGS. 5-10. The descriptions of input image, segmentation image, mask for training, and masked image described with reference to FIG. 11 are similar to FIG. 5, and hence repeated descriptions are omitted for brevity.

FIG. 11 shows an example mask type 1100 that is applied for various example input images 1105. In the example of FIG. 10, mask type 1000 is shown for examples of "Sub-Type3" including an "online payment concept" and "beautiful cupcake decorated with flower" as input images 1105. As seen in FIG. 11, the text description provides a scene or the overall description of input images 1105.

In some cases, an image processing system (e.g., image processing system 200) is configured to perform text2image generation. The image processing system performs image outpainting without text-based editing. In some cases, text-based editing includes text2image generation. According to some embodiments, mask type 1100 is jointly trained based on text-based inpainting.

In some cases, masks for training 1115 enable outpainting in input images 1105. Referring to FIG. 11, masks for training 1115 are configured to completely mask segmentation images 1110. Accordingly, masked images 1120 include a mask on the input images 1105. For example, masked image corresponding to "online payment concept" shows input image that is completely covered by mask (indicated in pink color).

According to an embodiment of the present disclosure, an image processing system is configured to support tight-mask editing using mask type 3 (e.g., which may be an example of a Mask Type 3 in Table 1). For example, in mask type 3, a user wants to replace a region with desired objects and textures without changing the shape or other pixels outside the masks. The generated object accurately follows the shape of the drawn masks. In some cases, the order of mask types follows the real code implementation, but is not necessarily related to real user inputs. In some examples, tight-mask editing (e.g., mask type 3) is suitable for AI segmentation masks. One or more embodiments of the present disclosure map the mask types (e.g., mask types described with reference to FIGS. 5-11) to different modes (i.e., ginp, goup, tinp, toup, text2img, etc.). In one aspect, mask type 3 may be processed using a tinp image editing mode. In one aspect, mask type 3 may be used to train a tinp image editing mode.

TABLE 1

| Modes | Text Condition | Image Condition | Similarity Input | Applications |
|---|---|---|---|---|
| custom | No Text<br>Input Text | Support<br>Support | Free (0)/Coarse (1)/<br>Tight (2) | Union of All |
| ginp | Ignore Text | Support | Disabled MaskType 0 | Generic Text-free Inpainting (Content Regeneration, Partial Object Completion, Object Removal etc.) |
| goup | Ignore Text | Support | Disabled MaskType 0 | Generic Text-free Outpainting (Background Completion, Image Extension/Uncropping/Aspect Ratio Changes) |
| tinp | Input Text (Simple to Complicated, Local to Global) | Support | Free (0) MaskType 2 | Any mask-based image editing tasks like object insertion/replacement/ variations, scene completion, background replacement/variations, reference-based content generation, texture blending, object blending, tilable material generation etc. |
|  |  |  | Coarse (1) MaskType 1 | Intelligent Brush, shape-guided object generation. |
|  |  |  | Tight (2) MaskType 3 | Regional texture replacement following the mask shape/Object replacement following the exact shape |
| toup | Input Text (Simple to Complicated, Local to Global) | Support | Disabled (using free now) MaskType 2 | Guided scene completion and background replacement. Guided outpainting. |
| text2img | Input Text (Global) | Support | Disabled MaskType 2 | Text-guided image generation and image variations. |

Image Inpainting and Outpainting

One or more embodiments of the present disclosure include generic inpainting and generic outpainting. In some cases, an image processing system performs specific sampling to avoid generation of unexpected objects in an output image. In some cases, image generation network (e.g., image generation network 230 as described with reference to FIG. 2) is used for generic scene regeneration and object removal. In some cases, a user does not want to generate an object in a hole region of the input image (e.g., without providing specific text or image guidance).

In some aspects, a conditional mask may be applied based on some specified condition or criterion. In other words, a mask may be applied to certain data points or features that meet a specific specification (e.g., while other data points or features are left unchanged). For example, in image segmentation tasks, a conditional mask type may be used to selectively apply a mask only to pixels within a specification (e.g., such as based on specified text, based on a specified region, based on a certain color range, based on a natural scene, etc.).

According to the present disclosure, a masking scheme may be designed to be suitable for different applications and conditional labels may be used to dispatch them. Sampling schemes may be designed to ensure image editing modes are working properly towards different applications (e.g., user cases).

In some aspects, conditional embeddings may include conditions or labels to reflect the structure or meaning of the data. In some aspects, conditional embeddings may be learned in a supervised manner, where each data point of the conditional embeddings is associated with some condition or label (e.g., which may allow for improved interoperability).

According to some embodiments of the disclosure, sampling component is configured to prevent generation of new objects. In some cases, sampling component refers to sampling component 235 of image processing system 200 (as described with reference to FIG. 2) that includes the classifier-free guidance of a diffusion model. In some cases, the normal classifier-free guidance sampling computes the conditional embedding e$\theta$(zt, c) and unconditional embedding e$\theta$(zt, $\emptyset$), and use alpha values as the guidance scale.

$$e^{\sim}\theta(zt, c) = e\theta(zt, \emptyset) + s \cdot (e\theta(zt, c) - e\theta(zt, \emptyset)) \quad (1)$$

In some cases, the diffusion model can include multiple conditions (i.e., masked image ci, mask cm, text ct, a reference image cr, mask mode cy etc.). The conditions are added to Equation 1 to obtain:

$$e^{\sim}\theta(zt, (ci, cm, ct, cr, cy0) = e\theta(zt, (ci, cm, \emptyset, cr, cy0)) + \quad (2)$$
$$s \cdot (e\theta(zt, (ci, cm, ct, cr, cy0)) - e\theta(zt, (ci, cm, \emptyset, cr, cy0)))$$

In some cases, Equation 2 is modified to reduce the model generating unexpected objects, in addition to the masking scheme during training.

$$e^{\sim}\theta(zt, (ci, cm, ct, cr, cy0) = e\theta(zt, (ci, cm, \emptyset, cr, cy2)) + \quad (3)$$
$$s \cdot (e\theta(zt, (ci, cm, ct, cr, cy0)) - e\theta(zt, (ci, cm, \emptyset, cr, cy2)))$$

According to an embodiment of the present disclosure, the non-text condition embedding is changed from the ginp/ goup mode to the object insertion (tinp/toup) mode. Thus, the rate of generating unexpected objects in the text-free inpainting mode is significantly reduced.

In some aspects, the unconditional embedding may be replaced with a conditional embedding (e.g., of another image generation mode). For example, two types of conditional embeddings may be combined at inference.

Accordingly, in some aspects, conditions may be identified that correspond to image editing modes, where a conditional embedding may be computed based on the conditions. In some aspects, the conditional embedding may describe how the image editing mode impacts the output image (e.g., based on the embedding vector, as the output images may be generated based on the conditional embedding).

In some aspects, an image editing mode may include, or may refer to, a combination of conditions of the conditional embedding vector (e.g., masked image, masked text, reference image, masked mode). An image editing mode may indicate whether there is text, a mask, a reference image, etc.

One or more embodiments of the present disclosure include a text-based inpainting mode. In some cases, users provide text guidance in text-based inpainting mode. The text-based inpainting mode supports user cases such as object insertion and general image content replacement. In some examples, the three similarity levels correspond to different mask types in the training.

According to some embodiments, similarity of zero (i.e., similarity=0) is a general mode when user wants to change the image contents. In some cases, a user does not change the shape. For example, users can draw a circle, box or arbitrary region. In some cases, contents are changed within the drawn regions. The general mode is optimal for large region editing with complicated text and works for single object insertion with simple description. In case the region is not large enough to cover the object, the generation quality may be sub-optimal.

Additionally, a mode of similarity of one (i.e., similarity=1) is designed for object insertion and user drawing. The mode provides for approximately following the shape of the drawn regions. In some cases, the mode is optimal for single object insertion with simple text (e.g., 'a cat', 'a yellow cat'), but may change some pixels outside the drawn mask. Another mode of similarity=2 targets at narrow user cases and follows the drawn shape. In some cases, the mode of similarity=2 does not change pixels outside the drawn masks and is optimal when the users want precise drawings (i.e., users want to draw carefully) or apply an AI-segmented mask. The mode of similarity=2 is optimal for use as 'texture brush'.

Accordingly, in some embodiments, similarity=0 is referred to as 'scene brush' with 'ginp/goup' model for erasing purpose. Additionally, similarity=1 is referred to as 'object brush' with 'ginp/goup' model for erasing purpose. The similarity=2 mode is referred to as 'texture brush' with 'ginp/goup' model for erasing purpose.

an image with mask region 1205 (indicated in grey color). Mask region 1205 is an example of, or includes aspects of, the corresponding element described with reference to FIGS. 13 and 14.

According to an embodiment of the present disclosure, users use similarity=0 that enables free editing of the images by randomly drawing masks corresponding to the regions the user may want to change. The hole (i.e., mask region) can be not related to the object shapes. The generated content can follow a text prompt the users provide, and can sample the visually pleasant contents inside the hole region. In some cases, image editing is suitable for user cases like DALL-E and SD. User-drawn masks are not dilated. Thus, contents outside the hole are not changed. In some cases, image generation network (e.g., image generation network 230) sets the default to this mode for hand-drawn masks.

Figure 12:
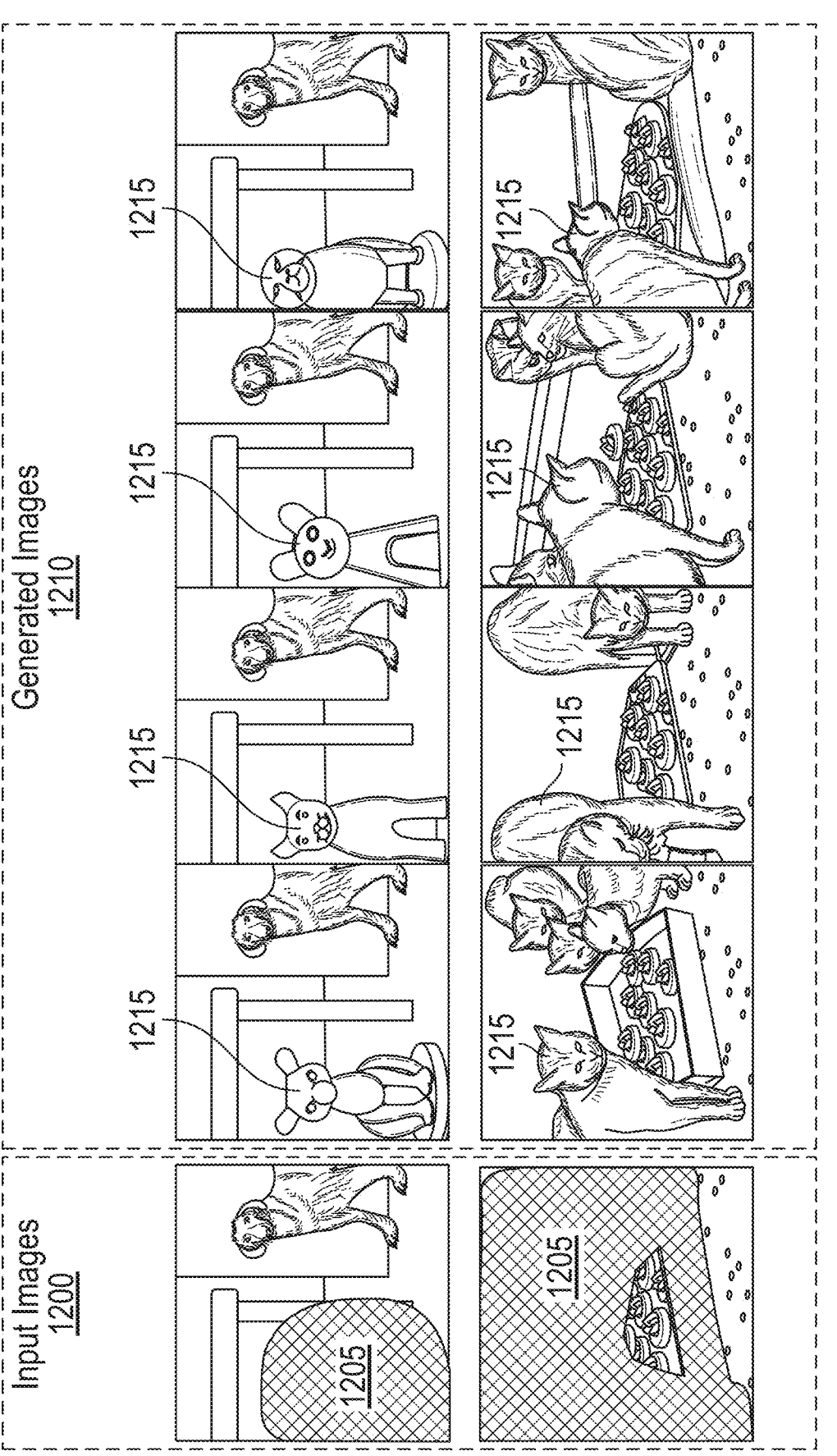
FIGS. 12 through 14 show example similarity modes according to aspects of the present disclosure.

Referring to FIG. 12, input images 1200 are provided to the image processing system with a text description that includes content for the image. For example, the text description is "a seated wooden cat" and "a group of four orange cats, all facing the cupcakes" that specifies or defines content 1215. The image processing system (i.e., image generation network) uses the input image with the mask region (in grey color) and the text description provided ("a seated wooden cat") to provide a generated image that includes the background of the input image with the seated wooden cat in the mask region. Generated image 1210 is an example of, or includes aspects of, the corresponding element described with reference to FIGS. 13-17. In one aspect, generated image 1210 includes content 1215. Content 1215

| Similarity | Suitable Text Input | Content Change | User Cases | Masks |
|---|---|---|---|---|
| 0 | any text type and levels (Examples Below) ● 'cat' ● 'a cat' ● 'a wooden cat' ● 'Seated wooden cat' ● 'Seated wooden cat in a living room' ● 'Seated wooden cat in a living room, four dogs are looking at her' ● "Seated wooden cat in a living room, four dogs are looking at her, photorealistic, warm color' | ✓ All the pixels inside the mask X Contents outside the mask | ■ Object Insertion ■ Partial Object Editing ■ Region Content Editing ■ Scene Generation | ■ Strokes ■ Box ■ Dilated Segmentation Mask (Less effective) |
| 1 | Simpler text and phrase, not for global editing (Examples Below) ● 'cat' ● 'a cat' ● 'a wooden cat' ● 'Seated wooden cat' ● 'Seated wooden cat in a living room' | ✓ All the pixels inside the mask ✓ Contents outside the mask | ■ Object Insertion ■ Partial Object Editing | ■ Strokes ■ Segmentation Mask |
| 2 | Simpler text and phrase, not for global editing (Examples Below) ● 'cat' ● 'a cat' ● 'a wooden cat' ● 'Seated wooden cat' ● 'Seated wooden cat in a living room' | ✓ All the pixels inside the mask X Contents outside the mask | ■ Region-constrained Texture Replacement ■ Shape-constrained Object Replacement | ■ Segmentation Mask ■ Strokes (less effective) |

FIG. 12 shows an example of a similarity mode according to aspects of the present disclosure. The example shown includes input images 1200 and generated images 1210.

Input images 1200 may be examples of, or include aspects of, the corresponding elements described with reference to FIGS. 5-11, and 13-17. In one aspect, input images 1200 includes mask region 1205. According to an embodiment, input image including mask region refers to the masked image generated as described with reference to FIGS. 5-11. As an example shown in FIG. 12, input images 1200 show is an example of, or includes aspects of, the corresponding element described with reference to FIGS. 13-17.

Figure 13:
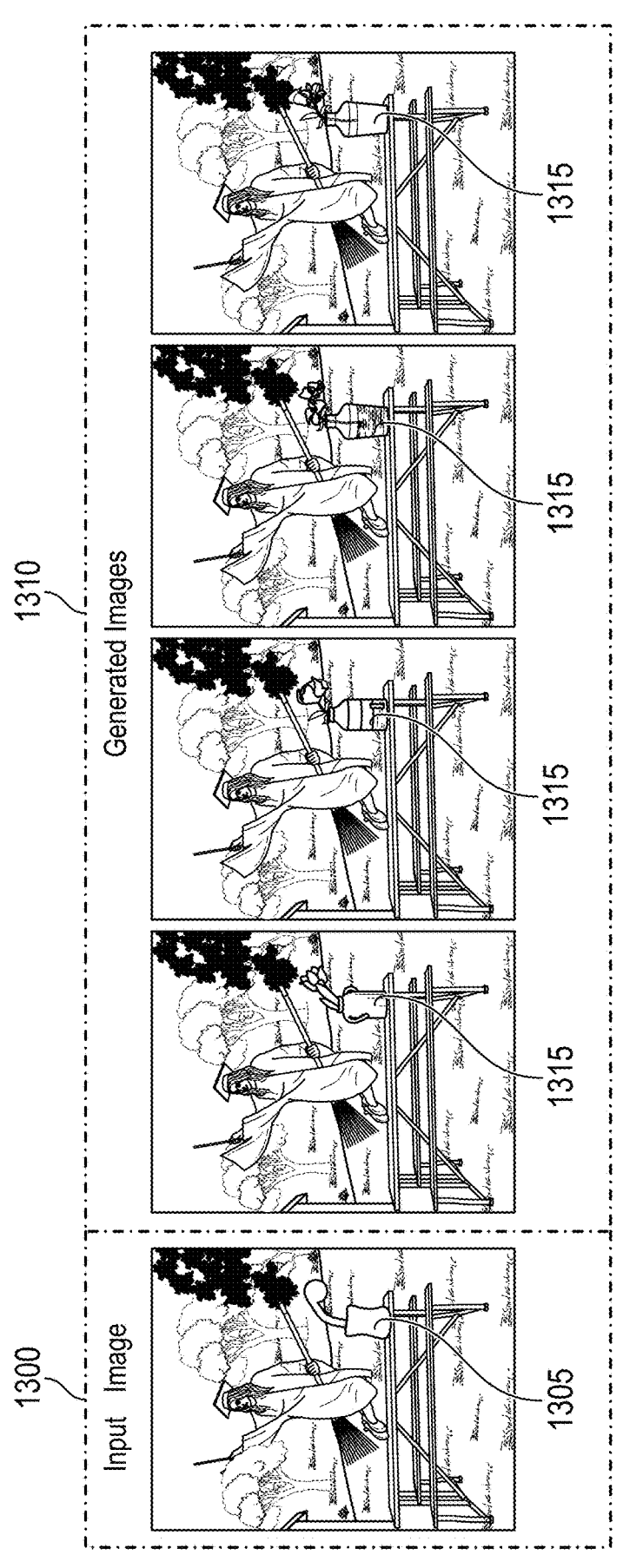

FIG. 13 shows an example of a similarity mode according to aspects of the present disclosure. The example shown includes input image 1300 and generated images 1310.

Input image 1300 is an example of, or includes aspects of, the corresponding element described with reference to FIGS. 5-12, and 14-17. In one aspect, input image 1300 includes mask region 1305. According to an embodiment, input image including mask region refers to the masked image generated as described with reference to FIGS. 5-11. In some cases, the mask region follows the shape of the object. As an example shown in FIG. 13, input image 1300 shows an image with mask region 1305 (indicated in orange color). Mask region 1305 is an example of, or includes aspects of, the corresponding element described with reference to FIGS. 12 and 14.

In some cases, the mode with similarity=1 is used for free hand-drawn strokes and works with dilated tight segmentation mask. In one embodiment, the mode is designed and used when the users want to insert a single object. In some examples, the users want to coarsely define the shape of the objects. The mode provides flexibility to the model to generate objects without accurately or closely following the mask shape. For example, in some cases, the mask shape may not be drawn to resemble the shape of the object.

Referring to FIG. 13, input image 1300 is provided to the image processing system with a text description that includes content for the mask region 1305 of the image. For example, the text description is "a bottle of flower" that specifies or defines content 1315. The image processing system (i.e., image generation network) uses the input image with the mask region (in orange color) and the text description provided ("a bottle of flower") to provide a generated image that includes the background of the input image with a bottle of flower in the mask region. Generated images 1310 may be examples of, or include aspects of, the corresponding elements described with reference to FIGS. 12 and 14-17. In one aspect, generated images 1310 includes content 1315. Content 1315 is an example of, or includes aspects of, the corresponding element described with reference to FIGS. 12 and 14-17.

Figure 14:
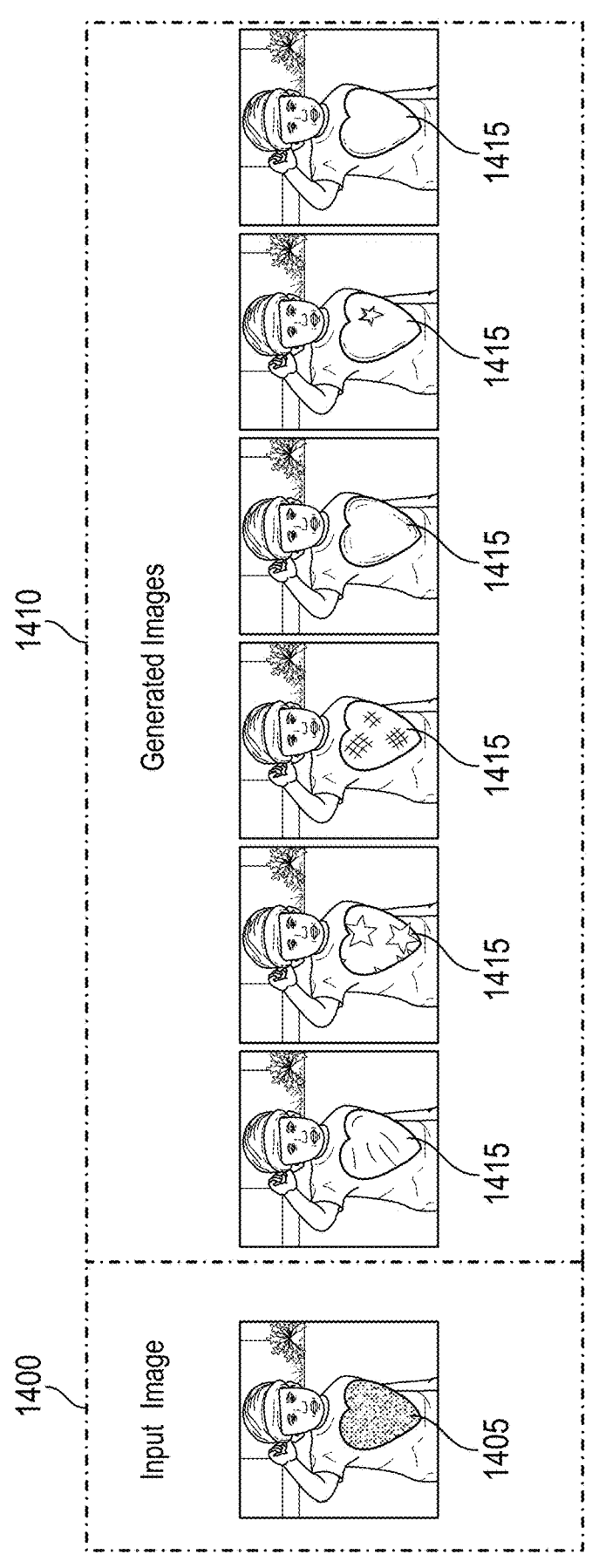

FIG. 14 shows an example of a similarity mode according to aspects of the present disclosure. The example shown includes input image 1400 and generated images 1410.

Input image 1400 is an example of, or includes aspects of, the corresponding element described with reference to FIGS. 5-13, and 15-17. In one aspect, input image 1400 includes mask region 1405. According to an embodiment, input image including mask region refers to the masked image generated as described with reference to FIGS. 5-11. In some cases, the mask region accurately or closely follows the shape of the object. As an example shown in FIG. 14, input image 1400 shows an image with mask region 1405 (indicated in black color). Mask region 1405 is an example of, or includes aspects of, the corresponding element described with reference to FIGS. 12 and 13.

In some cases, the mode with similarity=2 is used for hand-drawn masks and works with tight segmentation mask. In one embodiment, the mode is designed and used when the users want to perform shape constrained object replacement. In some examples, the users want to perform region-constrained object editing. The mode provides for the model to generate objects while accurately or closely following the mask shape. For example, in some cases, the mask shape is drawn to closely resemble the shape of the object to be inserted.

Referring to FIG. 14, input image 1400 is provided to the image processing system with a text description that includes content for the mask region 1405 of the image. For example, the text description is "red heart with stars" that specifies or defines content 1415. The image processing system (i.e., image generation network) uses the input image with the mask region (in black color) and the text description provided ("red heart with stars") to provide a generated image that includes the background of the input image with red heart with stars in the mask region. Generated images

1410 may be examples of, or include aspects of, the corresponding elements described with reference to FIGS. 12, 13, and 15-17. In one aspect, generated images 1410 include content 1415. Content 1415 is an example of, or includes aspects of, the corresponding element described with reference to FIGS. 12, 13, and 15-17.

Figure 15:
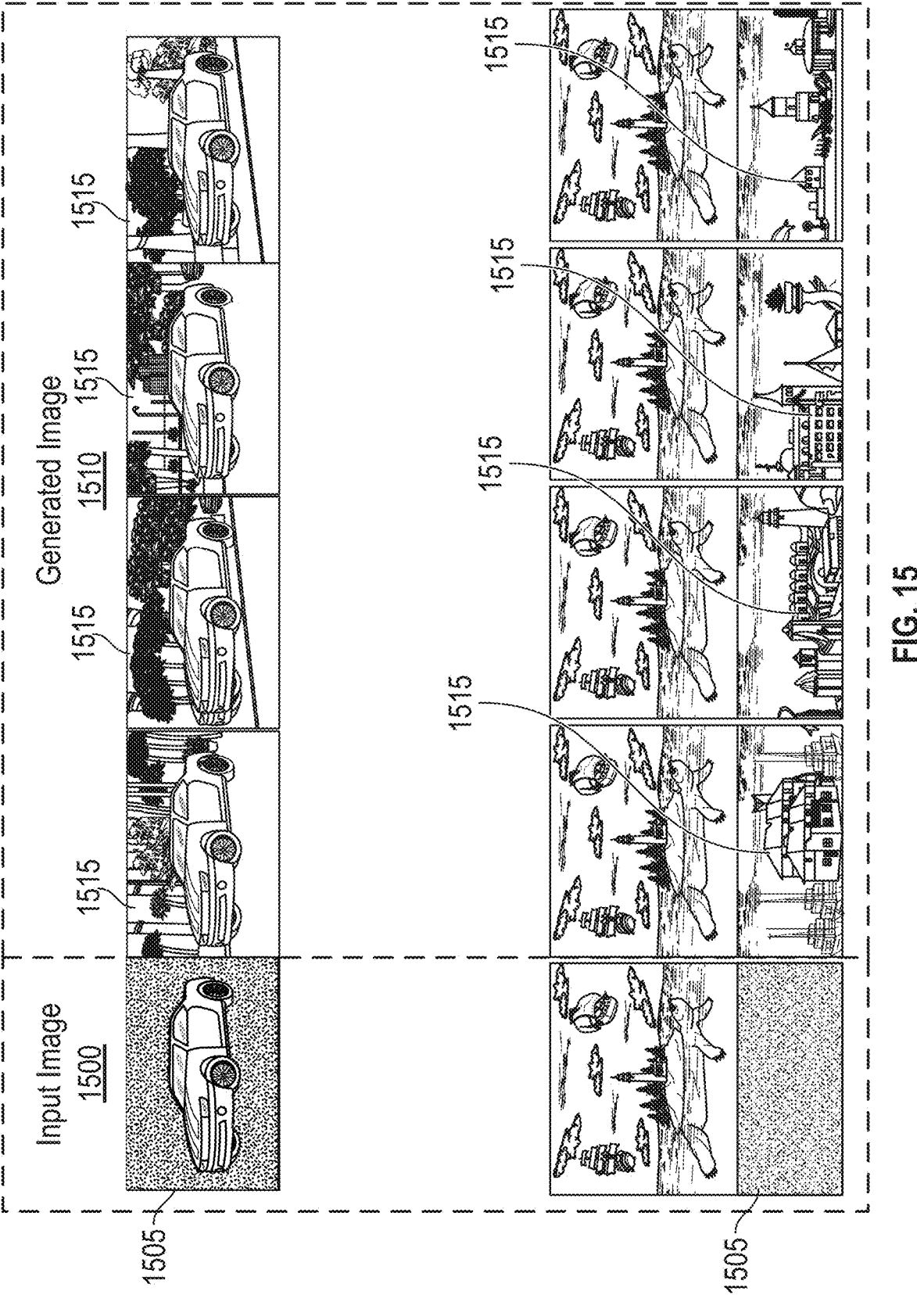
FIG. 15 shows an example of a text-based outpainting mode according to aspects of the present disclosure.

FIG. 15 shows an example of a text-based outpainting mode according to aspects of the present disclosure. The example shown includes input image 1500 and generated image 1510.

Input image 1500 is an example of, or includes aspects of, the corresponding element described with reference to FIGS. 5-14. In one aspect, input image 1500 includes outpainting region 1505. According to an embodiment, an input image including an outpainting region refers to the region generated as described with reference to FIG. 10. In some cases, the outpainting region accurately or closely follows the shape of the object. As an example shown in FIG. 14, input image 1400 shows an image with an object (e.g., yellow car) and outpainting region 1405 (indicated in grey color).

In some cases, a mode supports text-based outpainting using different dilation and padding strategies. For example, the mode provides for the model to perform text-guided image generation and image variations. For example, in some cases, the image generation network (e.g., image generation network 230) is configured to perform guided scene completion and background replacement.

Referring to FIG. 15, input image 1500 is provided to the image processing system with a text description that includes content for the outpainting region 1505 of the image. For example, the text description is "San Diego street with many palms trees" and "Award-winning illustration of a 19th-century underwater city" that specifies or defines content 1515. A shown in FIG. 15, the image processing system (i.e., image generation network) uses the input image (e.g. of the object "yellow car") with the outpainting region (in grey color) and the text description provided (e.g., "San Diego street with many palms trees") to provide a generated image that includes the object (e.g., a yellow car) of the input image with a background of "San Diego street with many palms trees". Generated images 1510 may be examples of, or include aspects of, the corresponding elements described with reference to FIGS. 12-14, 16, and 17. In one aspect, generated images 1510 include content 1515. Content 1515 is an example of, or includes aspects of, the corresponding element described with reference to FIGS. 12-14, 16, and 17.

In some examples, a mode supports text2img generation that is like Clio-core. In some cases, the mode supports text2img generation in a 1024×1024 canvas. The performance is on par with Clio-core model for any text inputs.

An embodiment of the present disclosure includes mask operation during inference time. In some cases, the image processing system is configured to perform a dilation operation and a content preservation level based on global mask alpha. For example, a dilation component (e.g., dilation component 240) of the image processing system performs a slight dilation operation or a coarse dilation operation based on the user cases.

According to an embodiment, the dilation component is configured to perform a slight dilation operation for user cases (e.g., object insertion, object editing, content editing, scene generation, etc.). In some cases, a slight gaussian blur is applied to the given mask and the mask is binarized for slight dilation. Additionally, coarse dilation is performed based on large blur kernel of gaussian and an approximate bounding box (e.g., a rough bounding box). Users can expect large background region changes in case of a 'tinp' mode with similarity=1. In some cases, dilation component performs dilation before inference to preserve the approximate shape (e.g., the rough shape) of the user-drawn mask. In some cases, dilation before inference provides the model with increased flexibility to adjust the shape for improved image generation quality.

Figure 16:
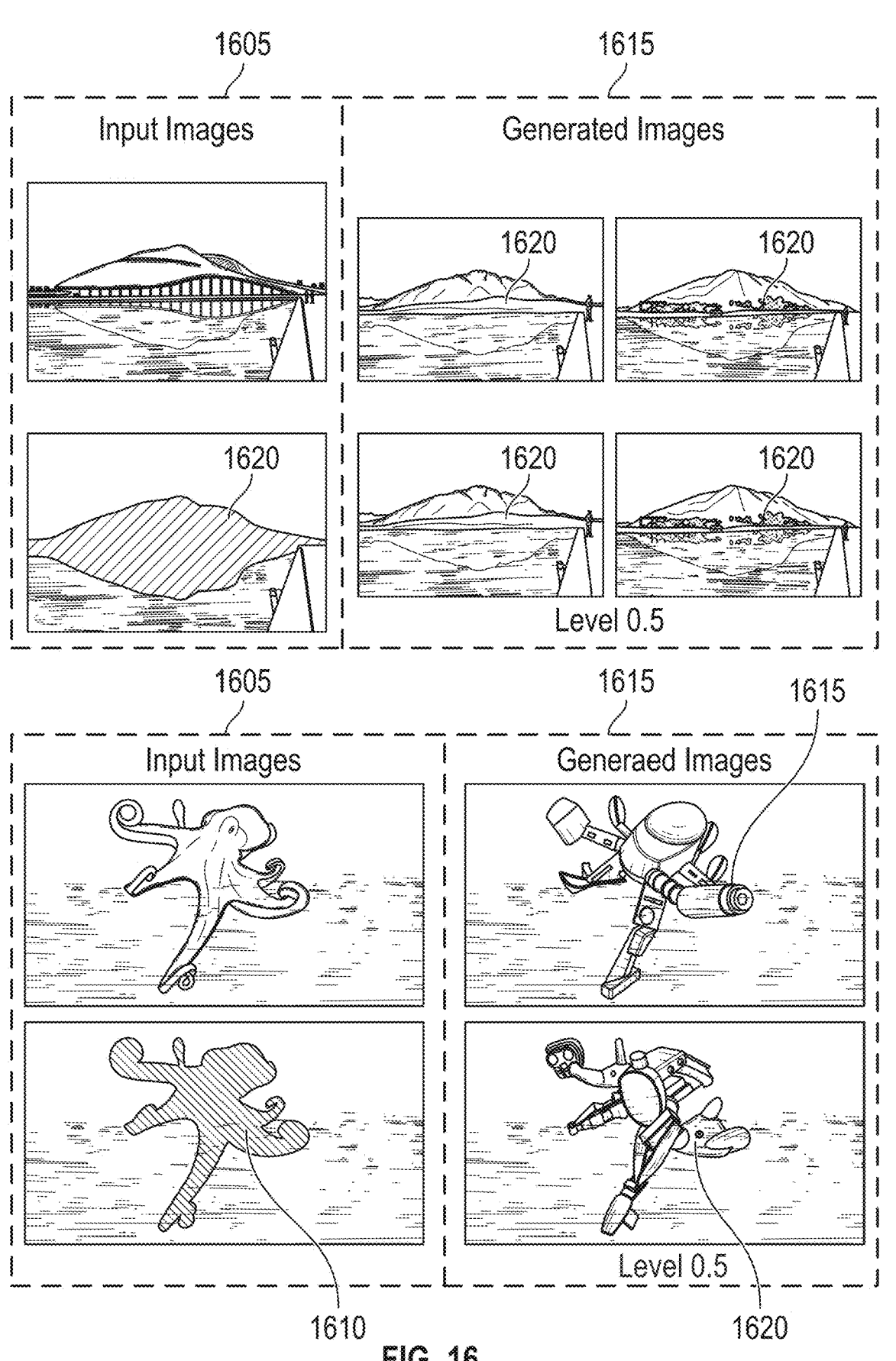
FIGS. 16 through 17 show example mask types according to aspects of the present disclosure.
Figure 17:
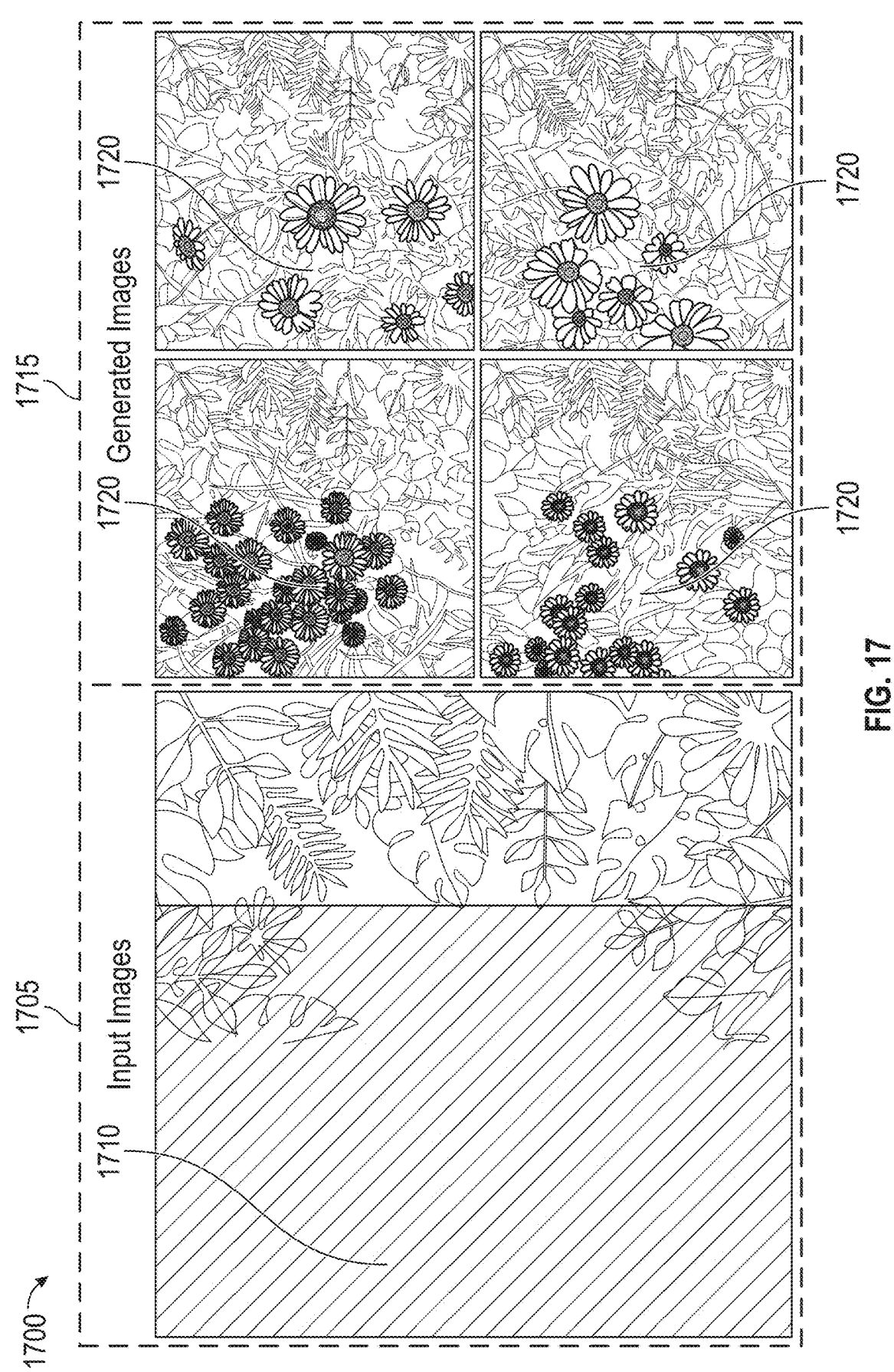

FIG. 16 shows an example of a mask type 1600 according to aspects of the present disclosure. Mask type 1600 is an example of, or includes aspects of, the corresponding element described with reference to FIGS. 5-11 and 17. In one aspect, mask type 1600 includes input image 1605 and generated image 1615. Input image 1605 is an example of, or includes aspects of, the corresponding element described with reference to FIGS. 5-15, and 17. In one aspect, input image 1605 includes mask region 1610. Mask region 1610 is an example of, or includes aspects of, the corresponding element described with reference to FIGS. 12-14, and 17. Generated image 1615 is an example of, or includes aspects of, the corresponding element described with reference to FIGS. 12-15, and 17. In one aspect, generated image 1615 includes content 1620. Content 1620 is an example of, or includes aspects of, the corresponding element described with reference to FIGS. 12-15, and 17. FIG. 17 shows an example of a mask type 1700 according to aspects of the present disclosure.

According to an embodiment of the present disclosure, the global mask alpha is used for content preservation level. For example, if a user wants to preserve different levels of image contents inside the hole or masked region, the user applies the global mask alpha argument to change the appearance or low-level features of the generated image. The values of content preservation level range between 0 to 1.

Referring to FIG. 16, masked image is provided to the image processing system with a text description that includes content for the generated image. In some cases, the masked image includes a mask region (indicated in pink color) that partially preserves the content of the original input image 1605. In the example of FIG. 16, the original input images 1605 include the white building with yellow lights and the octopus under water. An example text description in the context of example FIG. 16 may include "snow mountain" and "an underwater detection robot" that specifies or defines content 1620 for generated images 1615. As an example shown in FIG. 16, the content preservation level is "0.5".

The image processing system (i.e., image generation network) uses the masked image with preserved content (e.g., "Level 0.5") and the text description provided (e.g., "snow mountain") to provide a generated image. As shown in FIG. 16, a generated image 1605 includes a snow mountain from the text description while still preserving some of the content from the original input image (e.g., yellow lights).

FIG. 17 shows an example of a mask type 1700 according to aspects of the present disclosure. Mask type 1700 is an example of, or includes aspects of, the corresponding element described with reference to FIGS. 5-11, and 16. In one aspect, mask type 1700 includes input image 1705 and generated image 1715. Input image 1705 is an example of, or includes aspects of, the corresponding element described with reference to FIGS. 5-16. In one aspect, input image 1705 includes mask region 1710. Mask region 1710 is an example of, or includes aspects of, the corresponding element described with reference to FIGS. 12-14, and 16.

Generated image 1715 is an example of, or includes aspects of, the corresponding element described with reference to FIGS. 12-16. In one aspect, generated image 1715 includes content 1720. Content 1720 is an example of, or includes aspects of, the corresponding element described with reference to FIGS. 12-16.

An embodiment of the present disclosure includes a sampling component configured to support soft masks during image generation. In some cases, the sampling component refers to sampling component 235 of image processing system 200 (as described with reference to FIG. 2). In some cases, soft masks are used for texture blending.

Referring to FIG. 17, a masked image is provided to the image processing system. In some cases, the masked image includes a mask region (indicated in pink color) that partially covers the content of an input image. As an example, the masked image also shows a background with leaves. In some cases, the masked image is an example of, or includes aspects of, the corresponding element described with reference to FIGS. 8-11. According to an embodiment, image generation is performed without shape constraints.

The image generation network system (i.e., image generation network 230) outpaints the masked image for a scene completion while maintaining the texture blending with the original image to generate an image. Accordingly, the generated image includes the outpainted region with a blended texture. As an example shown in FIG. 17, the generated images include yellow flowers that blend with the background of leaves.

Figure 18:
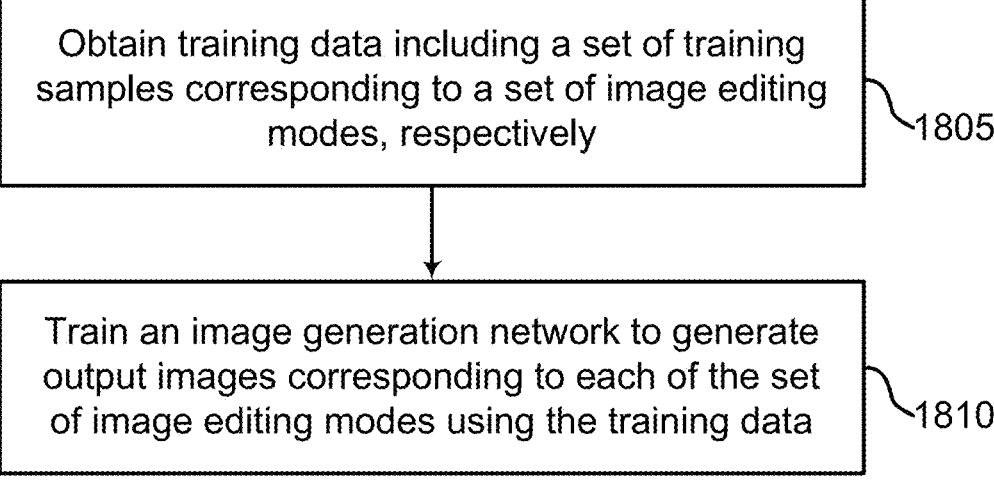
FIG. 18 shows an example of a method for image processing according to aspects of the present disclosure.

FIG. 18 shows an example of a method 1800 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1805, the system obtains training data including a set of training samples corresponding to a set of image editing modes, respectively. In some cases, the operations of this step refer to, or may be performed by, a training component as described with reference to FIG. 2. In some cases, the training samples may include information or data similar or analogous to masks for training 515-1115 and masked images 520-1120 (e.g., as described with reference to FIGS. 5-11).

For example, the system (e.g., a single network, such as an image generation network) may be trained using different masks (e.g., different mask types) for handling of different use cases (e.g., such that the system may efficiently handle different task types using a single model). For instance, the system may take a number of (e.g., 4) different conditional mask types as inputs for training (e.g., such as mask types 500-1100, among other examples).

At operation 1810, the system trains an image generation network to generate output images corresponding to each of the set of image editing modes using the training data. In some cases, the operations of this step refer to, or may be performed by, a training component as described with reference to FIG. 2.

Figure 19:
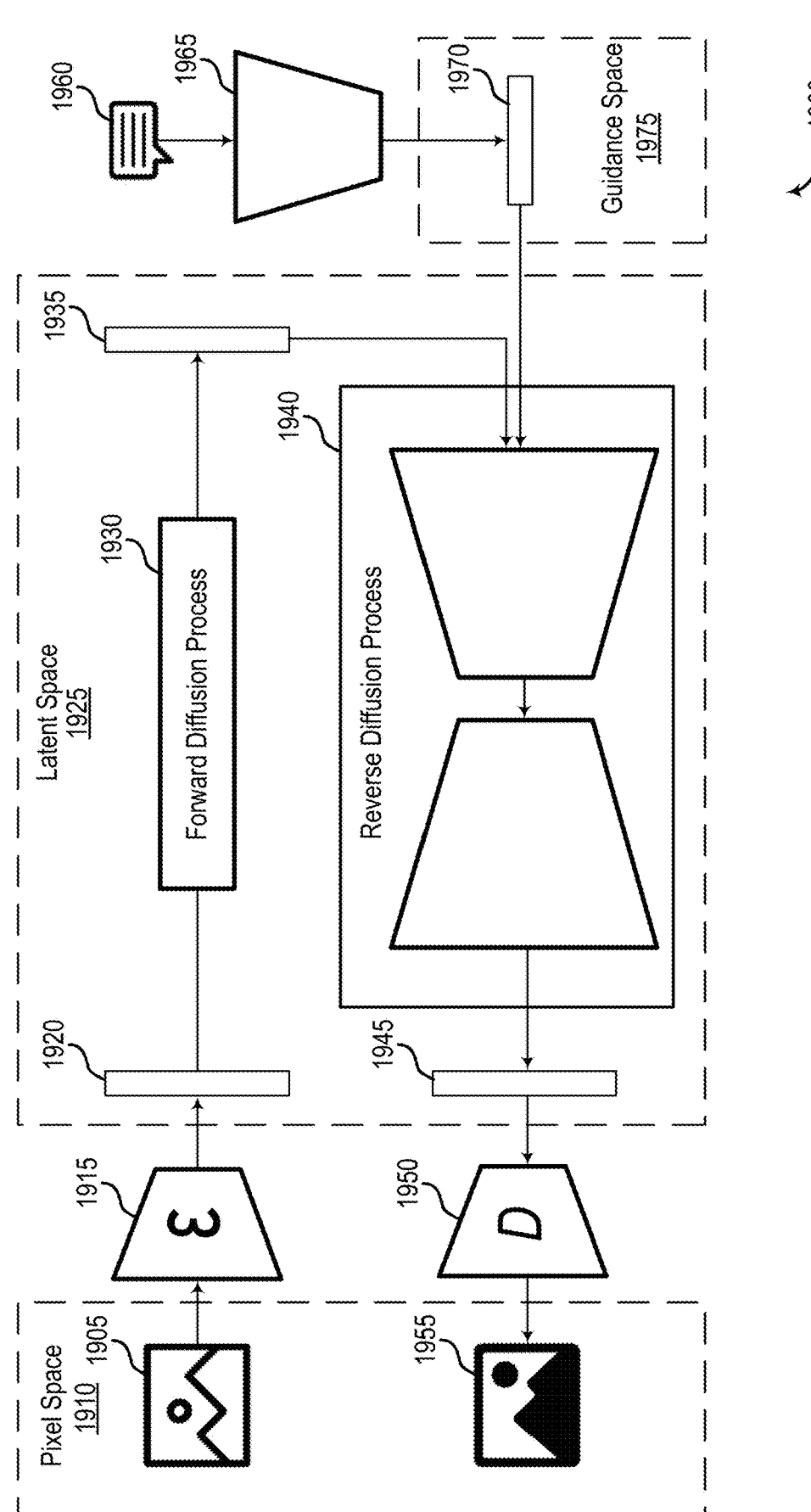
FIG. 19 shows an example of a guided latent diffusion model according to aspects of the present disclosure.

FIG. 19 shows an example of a guided latent diffusion model 1900 according to aspects of the present disclosure. As an example shown in FIG. 19, an image generation network (such as the image generation network described with reference to FIG. 2) can be implemented based on a diffusion model (e.g., a latent diffusion model or a pixel diffusion model). The guided latent diffusion model 1900 depicted in FIG. 19 is an example of, or includes aspects of, the image generation network described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1900 may take an original image 1905 in a pixel space 1910 as input and apply and image encoder 1915 to convert original image 1905 into original image features 1920 in a latent space 1925. Then, a forward diffusion process 1930 gradually adds noise to the original image features 1920 to obtain noisy features 1935 (also in latent space 1925) at various noise levels.

Next, a reverse diffusion process 1940 (e.g., a U-Net ANN) gradually removes the noise from the noisy features 1935 at the various noise levels to obtain denoised image features 1945 in latent space 1925. In some examples, the denoised image features 1945 are compared to the original image features 1920 at each of the various noise levels, and parameters of the reverse diffusion process 1940 of the diffusion model are updated based on the comparison. Finally, an image decoder 1950 decodes the denoised image features 1945 to obtain an output image 1955 in pixel space 1910. In some cases, an output image 1955 is created at each of the various noise levels. The output image 1955 can be compared to the original image 1905 to train the reverse diffusion process 1940.

In some cases, image encoder 1915 and image decoder 1950 are pre-trained prior to training the reverse diffusion process 1940. In some examples, they are trained jointly, or the image encoder 1915 and image decoder 1950 and fine-tuned jointly with the reverse diffusion process 1940.

The reverse diffusion process 1940 can also be guided based on a text prompt 1960, or another guidance prompt, such as an image, a layout, a segmentation map, etc. The text prompt 1960 can be encoded using a text encoder 1965 (e.g., a multimodal encoder) to obtain guidance features 1970 in guidance space 1975. The guidance features 1970 can be combined with the noisy features 1935 at one or more layers of the reverse diffusion process 1940 to ensure that the output image 1955 includes content described by the text prompt 1960. For example, guidance features 1970 can be combined with the noisy features 1935 using a cross-attention block within the reverse diffusion process 1940.

Therefore, a method, apparatus, and non-transitory computer readable medium for training a diffusion-based inpainting/outpainting model are described. One or more aspects of the method, apparatus, and non-transitory computer readable medium include obtaining training data including a plurality of training samples corresponding to a plurality of image editing modes, respectively and training an image generation network to generate output images corresponding to each of the plurality of image editing modes using the training data.

Some examples of the method, apparatus, non-transitory computer readable medium, and system further include identifying a plurality of conditions corresponding to each of the plurality of image editing modes. Some examples further include generating a conditional embedding based on the plurality of conditions for each of the training samples, wherein the image generation network is trained based on the conditional embedding. In some aspects, a first sample of the plurality of training samples comprises a text-based sample and a second sample of the plurality of training samples comprises a text-free sample. In some aspects, a first sample of the plurality of training samples comprises an inpainting sample and a second sample of the plurality of training samples comprises an outpainting sample.

FIG. 20 shows an example of a computing device 2000 according to aspects of the present disclosure. The example shown includes computing device 2000, processor(s) 2005, memory subsystem 2010, communication interface 2015, I/O interface 2020, user interface component(s) 2025, and channel 2030.

In some embodiments, computing device 2000 is an example of, or includes aspects of, image generation apparatus 100 of FIG. 1. In some embodiments, computing device 2000 includes one or more processors 2005 are configured to execute instructions stored in memory subsystem 2010 to obtain a prompt describing a scene, wherein the prompt includes scene text; encode, using a prompt encoder, the prompt to generate a prompt embedding; encode, using a character-level encoder, the scene text to generate a character-level embedding; and generate, using an image generation network, an image that includes the scene text based on the prompt embedding and the character-level embedding.

According to some aspects, computing device 2000 includes one or more processors 2005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 2010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2015 operates at a boundary between communicating entities (such as computing device 2000, one or more user devices, a cloud, and one or more databases) and channel 2030 and can record and process communications. In some cases, communication interface 2015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2020 is controlled by an I/O controller to manage input and output signals for computing device 2000. In some cases, I/O interface 2020 manages peripherals not integrated into computing device 2000. In some cases, I/O interface 2020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2020 or via hardware components controlled by the I/O controller.

According to some aspects, user interface component(s) 2025 enable a user to interact with computing device 2000. In some cases, user interface component(s) 2025 include an audio device, such as an external speaker system, an external display device such as a display screen, an input device (e.g., a remote control device interfaced with a user interface directly or through the I/O controller), or a combination thereof. In some cases, user interface component(s) 2025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:

obtaining an input image and a mask indicating an edit region of the image;

identifying a mask type of the mask from a plurality of predetermined mask types corresponding to a plurality of image editing modes;

selecting an image editing mode from the plurality of image editing modes of an image generation network based on the mask type by setting a configuration of the image generation network, wherein the plurality of image editing modes includes at least one inpainting mode and at least one outpainting mode;

identifying a plurality of conditions corresponding to the image editing mode;

computing a conditional embedding such that the mask is conditionally applied to certain data points or features of the input image that meet the plurality of conditions;

generating a partial image based on the mask; and generating, using the image generation network, an output image based on the input image, the conditional embedding, and the mask, by combining the input image and the partial image and performing an image editing task corresponding to the image editing mode according to the configuration of the image generation network, wherein the image generation network is trained to perform a plurality of image editing tasks corresponding to the plurality of image editing modes.

2. The method of claim 1, wherein:

the mask type is selected from a plurality of mask types including an object inpainting mask type, a texture inpainting mask type, an outpainting mask type, a shape guidance mask type, or any combination thereof.

3. The method of claim 2, wherein:

the image generation network is trained using a plurality of training data sets corresponding to the plurality of mask types, respectively.

4. The method of claim 1, further comprising:

obtaining a text prompt, wherein the image editing mode comprises a text-based image editing mode and the output image is generated based on the text prompt.

5. The method of claim 1, wherein:

the output image corresponds to the input image in a region outside of the edit region and includes generated content within the edit region.

6. The method of claim 1, further comprising:

computing a guidance sampling value based on a plurality of parameters including an image parameter, a mask parameter, a text parameter, a reference image parameter, a mask mode parameter, or any combination thereof.

7. The method of claim 1, further comprising:

identifying a text based inpainting similarity mode, wherein the output image is generated based on the text based inpainting similarity mode.

8. The method of claim 7, wherein:

the text based inpainting similarity mode comprises a scene brush mode, an object brush mode, or a texture brush mode.

9. The method of claim 1, further comprising:

identifying a dilation parameter, wherein the partial image is based on the dilation parameter.

10. An apparatus for image processing, comprising:

a processor and a memory storing instructions and in electronic communication with the processor, the processor being configured to execute the instructions to:

obtain an input image and a mask indicating an edit region of the image; identify a mask type of the mask from a plurality of predetermined mask types corresponding to a plurality of image editing modes;

identify an image editing mode from the plurality of image editing modes of an image generation network based on the mask type by setting a configuration of the image generation network, wherein the plurality of image editing modes includes at least one inpainting mode and at least one outpainting mode;

identify a plurality of conditions corresponding to the image editing mode;

compute a conditional embedding such that the mask is conditionally applied to certain data points or features of the input image that meet the plurality of conditions;

generate a partial image based on the mask; and generate an output image using the image generation network based on the input image, the conditional embedding, and the mask, by combining the input image and the partial image and performing an image editing task corresponding to the image editing mode according to the configuration of the image generation network, wherein the image generation network is trained to perform a plurality of image editing tasks corresponding to the plurality of image editing modes.

11. The apparatus of claim 10, wherein:

the mask type is selected from a plurality of mask types including an object inpainting mask type, a texture inpainting mask type, an outpainting mask type, a shape guidance mask type, or any combination thereof, and wherein the image generation network is trained using a plurality of training data sets corresponding to the plurality of mask types, respectively.

12. The apparatus of claim 10, the processor being further configured to execute the instructions to:

obtain a text prompt, wherein the image editing mode comprises a text-based image editing mode and the output image is generated based on the text prompt.

13. The apparatus of claim 10, wherein:

the output image corresponds to the input image in a region outside of the edit region and includes generated content within the edit region.

14. A method for image processing, comprising:

identifying a mask type from a plurality of predetermined mask types corresponding to a plurality of image editing modes;

obtaining training data including a plurality of training samples corresponding to the plurality of image editing modes, respectively, based on the mask type by setting a configuration of an image generation network, wherein the plurality of image editing modes includes at least one inpainting mode and at least one outpainting mode;

identifying a plurality of conditions corresponding to each of the plurality of image editing modes;

generating a conditional embedding for each of the training samples based on the plurality of conditions, such that a mask conditionally applies to certain data points or features of an input image that meet the plurality of conditions; and training the image generation network to generate a partial image based on the mask, and generate output images based on the conditional embedding and the mask type by combining an input image and the partial image, and performing an image editing task corresponding to each of the plurality of image editing modes according to the configuration of the image generation network using the training data.

15. The method of claim 14, wherein a first sample of the plurality of training samples comprises a text-based sample and a second sample of the plurality of training samples comprises a text-free sample.

16. The method of claim 14, wherein a first sample of the plurality of training samples comprises an inpainting sample and a second sample of the plurality of training samples comprises an outpainting sample.

* * * * *